(12) United States Patent
Tanaka et al.

(10) Patent No.: US 12,717,503 B2
(45) Date of Patent: Aug. 25, 2026

(54) STORAGE DEVICE AND STORAGE DEVICE RESTART METHOD CAPABLE OF CONTINUOUSLY PROCESSING AN INPUT/OUTPUT REQUEST FROM A HOST DEVICE

(71) Applicant: Hitachi Vantara, Ltd., Yokohama (JP)

(72) Inventors: Katsuya Tanaka, Tokyo (JP); Masahiro Tsuruya, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 19/073,308

(22) Filed: Mar. 7, 2025

(65) Prior Publication Data

US 2025/0370641 A1 Dec. 4, 2025

(30) Foreign Application Priority Data

May 31, 2024 (JP) ................................ 2024-089323

(51) Int. Cl.
*G06F 12/00* (2006.01)
*G06F 3/06* (2006.01)

(52) U.S. Cl.
CPC ............ *G06F 3/0632* (2013.01); *G06F 3/061* (2013.01); *G06F 3/0659* (2013.01); *G06F 3/0676* (2013.01); *G06F 3/0679* (2013.01)

(58) Field of Classification Search
CPC ...... G06F 3/0632; G06F 3/061; G06F 3/0659; G06F 3/0676; G06F 3/0679
USPC .......................................................... 711/154
See application file for complete search history.

(56) References Cited

U.S. PATENT DOCUMENTS

2022/0261164 A1* 8/2022 Zhuravlev ............. G06F 3/0632
2024/0134806 A1 4/2024 Shimada et al.
2024/0232099 A9 7/2024 Shimada et al.

FOREIGN PATENT DOCUMENTS

AU 2010234647 A1 * 11/2011 ........... G06F 3/0659
JP 2024-060523 A 5/2024
WO WO-2018075790 A1 * 4/2018 ......... G06F 12/0246

* cited by examiner

*Primary Examiner* — Mardochee Chery
(74) *Attorney, Agent, or Firm* — MATTINGLY & MALUR, PC

(57) ABSTRACT

The storage control program executes a restart process of restarting an updated operating system without initializing a first predetermined area on hardware used by the operating system, reallocates a virtual address to the first predetermined area after the restart process is finished, and resumes an input/output process by the first processor.

17 Claims, 17 Drawing Sheets

174
173
150
600
101
102
171
100
172
122
121
CTL0
HOST IF0
HOST IF1
CTL1
CPU0
CPU1
500
108
128
Core00
Core11
NTB0
NTB1
OQ01
IQ01
IQ11
OQ11
111
Uncore
Uncore
107
127
DMA0
DMA1
109
110
105
106
125
126
130
129
MEM0
MEM1
104
103
132
123
124
131
152
151
141
PDEV SW0
PDEV SW1
161
144
143
163
142
164
162
140
PDEV0
PDEVn
PDEV BOX

STORAGE DEVICE AND STORAGE DEVICE RESTART METHOD CAPABLE OF CONTINUOUSLY PROCESSING AN INPUT/OUTPUT REQUEST FROM A HOST DEVICE

CROSS-REFERENCE TO RELATED APPLICATION

The present application claims priority from Japanese application JP2024-089323, filed on May 31, 2024, the content of which is hereby incorporated by reference into this application.

BACKGROUND OF THE INVENTION

1. Field of the Invention

The present invention relates to a storage device and a method for restarting the storage device, and, for example, is preferably applied to a storage device related to a technology in which a processor performs a data input/output process in response to an input/output request from a host device while controlling a host interface.

2. Description of the Related Art

In the storage device, a plurality of storage controllers (hereafter referred to simply as controllers) that control the storage device are provided, and even if a failure occurs in any one of the controllers and the operation of the failed controller is stopped, the remaining controllers can continue to operate to ensure reliability. A typical number of such controllers is two.

In the storage device, an operating system (OS) controlled by a processor may be installed in the controller (cf. JP 2024-060523 A), and in addition to the failure described above, the execution of a restart process for the OS (e.g., a restart process associated with an update process for the OS or the like) at arbitrary timing may cause a function of the processor of one controller to temporarily stop.

Patent Literature: JP 2024-060523 A

SUMMARY OF THE INVENTION

In the OS restart process at arbitrary timing (in the storage device described above, the restart process associated with the OS update process or the like in the one controller), it is conceivable that the input/output request from the host device is automatically reconnected to the other controller including a processor that has not been stopped in the restart process. However, to interrupt an input/output request process in one controller to be subject to the OS restart process at arbitrary timing (in the storage device described above, the controller with its OS to be subject to the update process), the host device needs to retransmit the input/output request to the other controller that is not subject to the OS restart process (in the storage device, the other controller that is not subject to the OS update). That is, in the storage device, there has been a risk of temporary difficulty in continuing the input/output process when the OS restart process is executed at arbitrary timing (in the storage device described above, the restart process associated with the OS update process or the like). In addition, while the one controller executes the OS restart process at arbitrary timing (the restart process associated with the OS update process or the like in the one controller of the storage device described above), the data received from the host device is not duplicated, which causes a problem in data redundancy.

The present invention has been made in view of the above points, and it is an object of the present invention to propose a storage device and a method for restarting the storage device that are capable of continuously processing an input/output request from a host device and reliably duplicating data received from the host device, even when one controller of a plurality of controllers is stopped by a restart process for an operating system (e.g., a restart process associated with an update process for an operating system).

To solve such a problem, the present invention provides a storage device including: a first controller including a first processor that controls an input/output process for data according to a request from a host device via a host interface that controls a protocol of communication with the host device, and a first memory having a storage area used by the first processor; at least one second controller including a second processor that controls the input/output process for the data according to the request from the host device via the host interface that controls the protocol of communication with the host device, and a second memory having a storage area used by the second processor; and an inter-controller link that connects the first controller and the second controller. The first processor executes an operating system and a storage control program that controls the input/output process for the data according to the request from the host device. The storage control program includes a placement unit that allocates a virtual address to a first predetermined area in the first memory to which a virtual address is not allocated by the operating system, and places, in the first predetermined area, a first control queue in which the data of the input/output process via the host interface is temporarily stored, a takeover unit that takes over the input/output process from the first processor to the second processor and releases the allocation of the virtual address to the first predetermined area when a restart process of restarting the operating system is executed, a restart unit that executes the restart process of restarting the operating system without initializing the first predetermined area on hardware used by the operating system, and a process resumption unit that reallocates the virtual address to the first predetermined area after the restart process is finished and resumes the input/output process by the first processor.

Further, the present invention provides a method for restarting a storage device that includes a first controller including a first processor that controls an input/output process for data according to a request from a host device via a host interface that controls a protocol of communication with the host device, and a first memory having a storage area used by the first processor, at least one second controller including a second processor that controls the input/output process for the data according to the request from the host device via the host interface that controls the protocol of communication with the host device, and a second memory having a storage area used by the second processor, and an inter-controller link that connects the first controller and the second controller. The first processor executes an operating system and a storage control program that controls the input/output process for the data according to the request from the host device. The storage control program executes: a placement step of allocating a virtual address to a first predetermined area in the first memory to which a virtual address is not allocated by the operating system, and placing, in the first predetermined area, a first control queue in which the data of the input/output process via the host interface is temporarily stored; a takeover step of taking over the input/output process from the first processor to the second processor and releasing the allocation of the virtual address to the first predetermined area when a restart process of restarting the operating system is executed; a restart step of executing the restart process of restarting the operating system without initializing the first predetermined area (non-OS management area 204) on hardware used by the operating system; and a process resumption step of reallocating the virtual address to the first predetermined area after the restart process is finished and resuming the input/output process by the first processor.

According to the present invention, even when one controller of the plurality of controllers is stopped by the restart process for the operating system (e.g., the restart process associated with the update process for the operating system), an input/output (IO) request from the host device can be continuously processed, and the data received from the host device can be duplicated.

DESCRIPTION OF THE PREFERRED EMBODIMENTS

Figure 1:
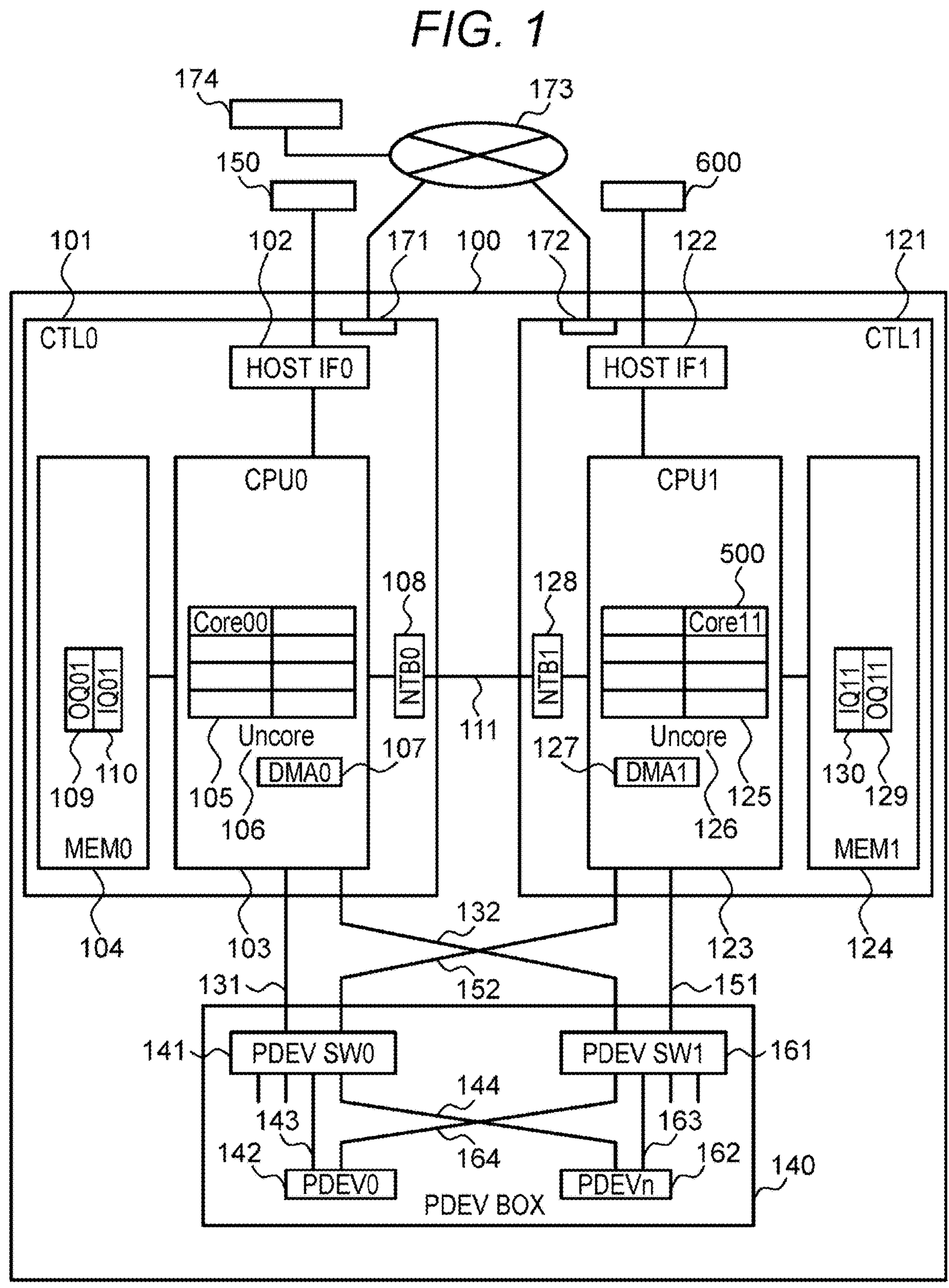
FIG. 1 is a system configuration diagram showing a configuration example of a storage device according to a first embodiment.

Hereinafter, an embodiment of the present invention will be described in detail with reference to the drawings. Note that components denoted by the same reference numerals are assumed to be substantially the same throughout all the embodiments. A process executed by a processor is appropriately performed using a storage resource (e.g., memory) and a communication interface device (e.g., communication port), so that the processor may serve as the subject of the process. The processor may include dedicated hardware in addition to a central processing unit (CPU).

In the following description, a "memory" is the main storage device in a general computer system and may be one or more storage devices. For example, of the main storage device (typically a volatile storage device) and an auxiliary storage device (typically a non-volatile storage device), the memory may be at least the main storage device.

In the following description, a "partial discharge extinction voltage (PDEV)" refers to a physical storage device and may typically be a non-volatile storage device (e.g., auxiliary storage device). The PDEV may be, for example, a hard disk drive (HDD) or a solid-state drive (SSD).

(1) First Embodiment

A storage device according to a first embodiment will be described with reference to FIGS. 1 to 11. FIG. 1 is a system configuration diagram showing a configuration example of a storage device 100 according to the first embodiment. In the shown configuration example, to simplify the description, a part of the connection relationship between the elements is omitted (hereinafter, the same applies to drawings other than FIG. 1).

The storage device 100 according to the present embodiment includes: a first controller (hereinafter also referred to as a "controller") 121 including a CPU 123 as an example of a first processor that controls an input/output process for data according to a request from a host device via a host interface (IF) that controls a protocol of communication with the host device, and a first memory (hereinafter also referred to as a "memory") 124 having a storage area used by the CPU 123; at least one second controller (hereinafter also referred to as a "controller") 101 including a CPU 103 as an example of a second processor that controls an input/output process of data according to a request from the host device via the host IF that controls the protocol of communication with the host device, and a second memory (hereinafter also referred to as a "memory") 104 having a storage area used by the CPU 103; and an inter-controller link 111 that connects the controller 121 and the controller 101. Since both the controllers 121, 101 have substantially the same configuration and function, only one control side may be referred to when it is not particularly necessary to refer to both the controllers. Note that the number of controllers of the storage device 100 is not limited to two and may be more than two. As a process of restarting the OS of the controller of the storage device 100 at arbitrary timing, the present embodiment will be described by taking a process of restarting the OS associated with an update process for the OS of the controller as an example, but the present invention is not limited thereto. For example, the OS of the controller of the storage device 100 may be restarted when the administrator of the storage device 100 determines that it is necessary. A more specific description will be given below.

The storage device 100 includes the controllers 101, 121 and a PDEV BOX 140 with a plurality of PDEVs, including PDEVs 142, 162.

In the storage device 100, a logical volume capable of storing data on a plurality of drive devices is configured, and a data input/output process is executed by the controllers 101, 121.

The controller 101 includes a host interface (IF) 102, a CPU 103, a memory 104, and a non-transparent bridge (NTB) 108. The host IF 102, the CPU 103, and the NTB 108 are mutually connected by, for example, a peripheral component interconnect express (PCIe) link. Similarly, the controller 121 includes a host IF 122, a CPU 123, a memory 124, and an NTB 128. The host IF 122, the CPU 123, and the NTB 128 are mutually connected by, for example, a PCIe link. The CPU 103 and the memory 104 are connected by a memory bus, and the CPU 123 and the memory 124 are connected by a memory bus.

The controllers 101, 121 respectively include management terminal IFs 171, 172 for connecting to the management terminal 174 via the management terminal network 173. The administrator of the storage device 100 can operate the management terminal 174 to execute a setting change for the storage device 100, the update process and the restart process for the controller OS (hereinafter also abbreviated as "OS"), and the like.

The CPU 103 includes a plurality of cores 105 and an uncore 106 that is a portion other than the plurality of cores 105. The uncore 106 includes a direct memory access (DMA) 107. Similarly, the CPU 123 includes a plurality of cores 125 and an uncore 126 that is a portion other than the plurality of cores 125. The uncore 126 includes a DMA 127.

Host devices 150, 600 that access the storage device 100 are connected to the storage device 100 via the host IFs 102, 122, respectively. The host devices 150, 600 and the host IFs 102, 122 are connected by transmission lines such as fiber channel cables or Ethernet cables. Alternatively, the host devices 150, 600 and the host IFs 102, 122 may be connected via a storage area network (not shown) including a plurality of transmission lines and a plurality of switches.

The host IFs 102, 122 convert data transfer protocols between the host devices 150, 600 and the storage device 100 and data transfer protocols in the controllers 101, 121.

The PDEV BOX 140 is connected to the controllers 101, 121 via links 131, 132, 151, 152. The PDEV BOX 140 includes PDEV switches 141, 161 that connect the PDEVs 142, 162 via links 143, 144, 163, 164. In the present embodiment, the links 131, 132, 143, 144, 151, 152, 163, 164 are PCIe links. The PDEV switches 141, 161 are PCIe switches, and the PDEVs 142, 162 are non-volatile memory express (NVMe) drives including dual ports. In the PDEV BOX 140 of FIG. 1, an example in which only two PDEVs are installed is shown, but the number of PDEVs installed in the PDEV BOX 140 is arbitrary. The CPUs 103, 123 control data transfer between the host devices 150, 600 connected via the host IFs 102, 122 and the PDEVs 142, 162 connected via the PDEV switches 141, 161. Furthermore, the CPUs 103, 123 control data transfer between the controllers.

The memories 104, 124 are the main storage devices of the CPUs 103, 123, respectively, and store programs (OS, storage control program, etc.) executed by the CPUs 103, 123, management tables referred to by the CPUs 103, 123, and the like. The memories 104, 124 are also used as the cache memories of the controllers 101, 121, respectively.

The NTB 108 and the NTB 128 are connected by an inter-controller link 111 that is a PCIe link. The CPU 103 and the CPU 123 can communicate with each other via the inter-controller link 111. In this manner, the storage device 100 constitutes a dual controller with the two controllers 101, 121. The CPUs 103, 123 transfer, via the inter-controller link 111, data received from the host and duplicated in the two controllers and metadata used for controller control.

The memories 104, 124 each include an outbound queue (OQ) and an inbound queue (IQ) that are queues for controlling message transfer between the CPUs 103, 123 and the host IFs 102, 122. The OQ is a queue that controls message transfer from the host IF to the CPU, and the IQ is a queue that controls message transfer from the CPU to the host IF. The memory 104 includes an OQ 109 and an IQ 110 that are queues for controlling message transfer between the CPU 103 and the host IF 102. The memory 124 includes an OQ 129 and an IQ 130 that are queues for controlling message transfer between the CPU 123 and the host IF 122.

In FIG. 1, the OQ 109 is also referred to as an "OQ 01", the IQ 110 is also referred to as an "IQ 01", the OQ 129 is also referred to as an "OQ 11", and the IQ 130 is also referred to as an "IQ 11".

A process in which the host IFs 102, 122 store data received from the host devices 150, 600 in the memories 104, 124, or a process in which the host IFs 102, 122 transmit data stored in the memories 104, 124 to the host devices 150, 600, and a process related thereto will be referred to as a host IO process (hereinafter also referred to as an "input/output process").

In addition, a process of writing data stored in the memories 104, 124 into the PDEVs 142, 162, or a process of reading the data stored in the PDEVs 142, 162 into the memories 104, 124, and a process related thereto will be referred to as a back-end process.

A process of duplicating data received from the host devices 150, 600 in the memory 104 and the memory 124 using the DMAs 107, 127 and a process related thereto will be referred to as a host data duplication process.

Figure 2:
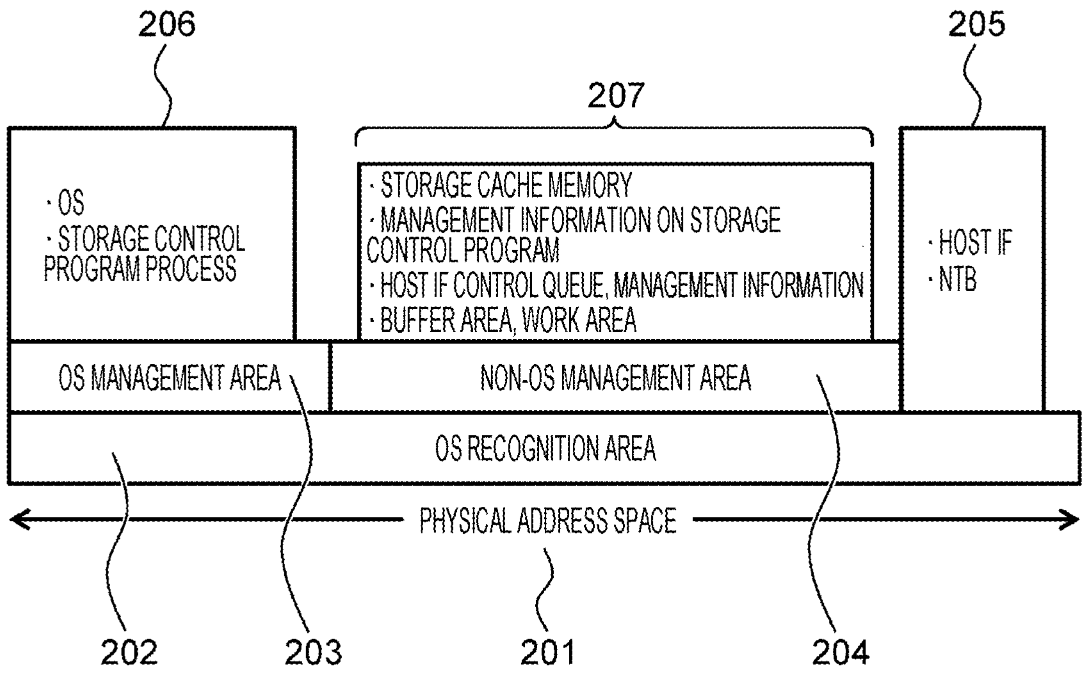
FIG. 2 is a diagram showing an example of a memory space.

FIG. 2 is a diagram showing an example of a memory space used by the CPU 123, for example. The physical address space 201 includes an OS recognition area 202 that is a memory address area recognizable by the OS. Note that the memory space used by the CPU 103 has a similar configuration, and thus, the description thereof will be omitted.

The OS recognition area 202 includes an OS management area 203, a non-OS management area 204 as an example of a first predetermined area, and an IO area 205. The OS management area 203 is a memory area that the OS allocates a virtual address to and uses. The non-OS management area 204 is a memory area that the OS does not allocate a virtual address to and does not use. The IO area 205 is a memory area accessible to the IO device for reading or writing the memory.

The CPU 123 executes an OS and a storage control program that controls the data input/output process according to the request from the host device. The OS management area 203 includes an OS usable area 206. In the OS usable area 206, the OS, the process of the storage control program, and the like are placed.

The non-OS management area 204 includes a storage control program information storage area 207. In the storage control program information storage area 207, the cache memory of the storage device 100, storage control program management information, a host IF control queue, host IF management information, a buffer area, a work area, and the like are arranged. In the non-OS management area 204, the storage control program allocates a virtual address to a predetermined area, which is at least a part of the storage area, and the predetermined area is used as the storage control program information storage area 207. Normally, for example, the OS does not allocate a virtual address to the non-OS management area 204 and does not use the non-OS management area 204.

The storage control program information storage area 207 is used as, for example, a storage cache memory, a buffer area, and a work area, and includes the management information on the storage control program and control queue and the management information on the host IF. Here, the control queues of the host IF correspond to the OQ 129 and the IQ 130 as an example of a first control queue in the case of the CPU 123 as an example of the first processor, and correspond to the OQ 109 and the IQ 110 as an example of a second control queue in the case of the CPU 103.

In the IO area 205, the access area of the IO device including the host IF 102, the access area of the NTB 108, and the like are placed. The CPU 123 can access the memory 104 and the host IF 102 of the other controller 101 via the access area of the NTB 108.

The storage control program allocates a virtual address to the non-OS management area 204 as an example of the first predetermined area in the memory 124 (first memory) to which a virtual address is not allocated by the operating system, and places the OQ 109 and the IQ 110 as an example of the first control queue in which data of the input/output process via the host interface is temporarily stored in the non-OS management area 204 (placement unit).

The storage control program executes the following processes when executing the restart process of restarting the operating system. Here, the restart process is, for example, a process of restarting the updated operating system associated with the update process for the operating system. First, the storage control program takes over the input/output process from the CPU 123 (first processor) to the CPU 103 (second processor) and releases the allocation of the virtual address to the non-OS management area 204 (takeover unit).

The storage control program executes the restart process of restarting the updated operating system without initializing the non-OS management area 204 on the hardware used by the operating system (restart unit). Next, after the restart process described above is finished, the storage control program reallocates the virtual address to the non-OS management area 204 and resumes the input/output process by the first processor (e.g., the CPU 123) (process resumption unit).

The CPU 103 is an example of a second processor, and accesses the host interface via a data transfer path passing through the inter-controller link 111. The data transfer path includes a data transfer path passing between two ports included in the CPU 123 (first processor). The CPU 103 accesses the OQ 109 and the IQ 110 as an example of the first control queue via a data transfer path passing through the inter-controller link 111.

The CPU 123 includes the DMA 127, and the CPU 103 includes the DMA 107. Before the input/output process is taken over from the CPU 123 to the CPU 103, the data received from the host device is duplicated by data transfer from the memory 124 (first memory) to the memory 104 (second memory) by the DMA 127 of the CPU 123. After the input/output process is taken over from the PU123 to the CPU 103, the data received from the host device is duplicated by data transfer from the memory 124 (first memory) to the memory 104 by the DMA 107 of the CPU 103.

When executing the restart process for the operating system, the storage control program stops the process of the CPU 123 writing the data received from the host device and stored in the memory 124 (first memory) into a storage medium.

Figure 3:
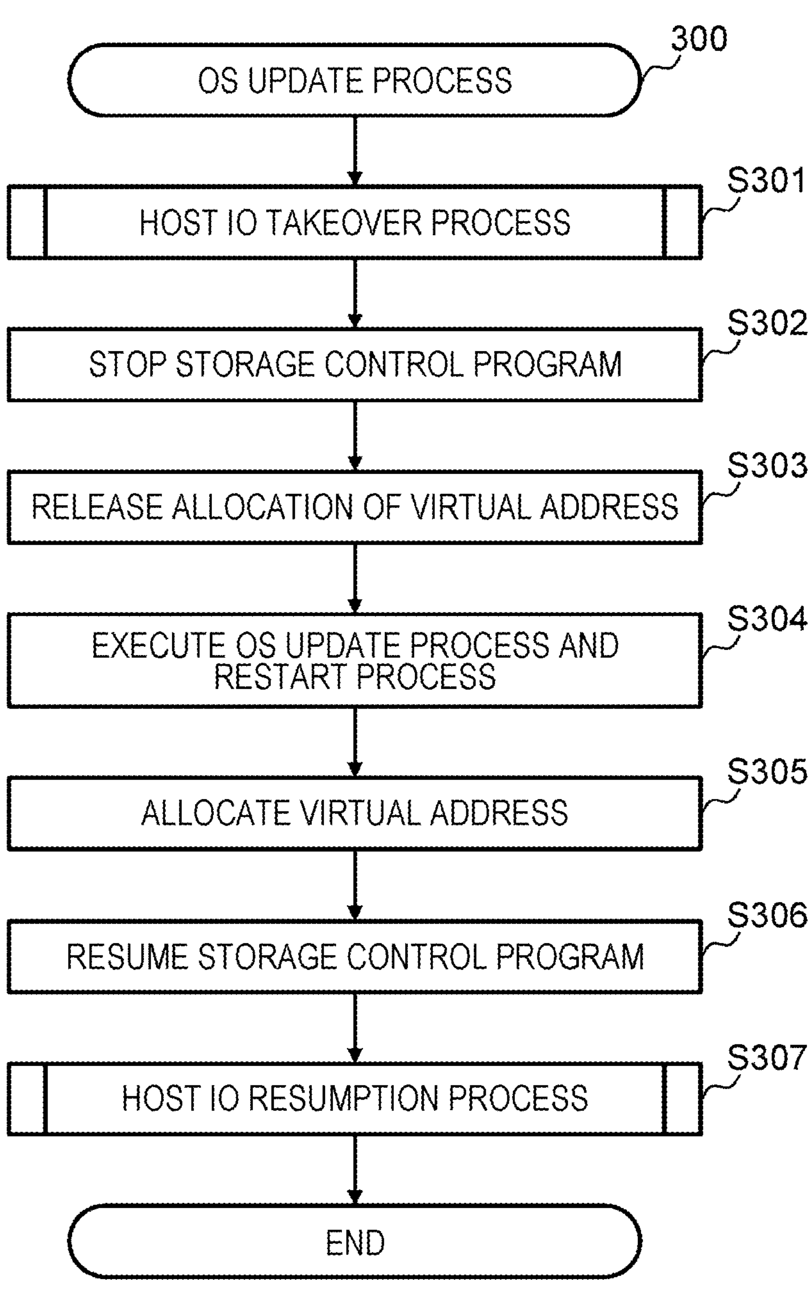
FIG. 3 is a flowchart showing an example of a procedure for an OS update process and a restart process.

FIG. 3 is a flowchart showing an example of a procedure for an OS update process of the controller in the storage device 100 and a restart process associated with the OS update process. This flowchart is executed by an OS update process program 300 under the control of the CPU 123 of the controller that has received an instruction to update the OS of the controller 121 from the management terminal 174. In the present embodiment, as an example, a case where the OS operating on the CPU 123 of the controller 121 is updated will be described.

First, the administrator of the storage device 100 instructs the controller 121 to update the OS via the management terminal 174. The CPU 123 of the controller 121 that has received the instruction executes the OS update process program 300.

The OS update process program 300 takes over the host IO process executed by the controller 121 to the controller 101 (step S301). Details of the host IO takeover process will be described later. With this process, the storage device 100 can continue the host IO process even during the restart process associated with the OS update process or the like, so that the availability can be maintained. Continuing the host IO process during the OS restart process eliminates the need to retransmit the input/output request from the host device when the OS restart process is executed, thus reducing power consumption required to retransmit the input/output request.

Next, the OS update process program 300 stops the storage control program operating on the CPU 123 of the controller 121 (step S302). Note that the OS update process program 300 may be included in the storage control program. In this case, in step S302, a part of the storage control program other than the OS update process program 300 is stopped. For example, the storage control program and the OS update process program 300 are executed as separate processes, and the process of the storage control program is stopped.

Next, the OS update process program 300 makes the storage control program information storage area (207 in FIG. 2) inaccessible by the virtual address in the memory 124 having the storage area used by the CPU 123 (step S303). In other words, the allocation of the virtual address to the storage control program information storage area 207 is released by execution of a munmap command or the like of the OS.

Next, the OS update process program 300 causes the CPU 123 of the controller 121 to execute an OS update process and a restart process (step S304). Here, in the OS restart process, for example, a mechanism that enables live boot of a new kernel on a currently activated kernel is adopted as a mechanism that does not involve hardware initialization. As such a mechanism, for example, kexec can be adopted when the OS is Linux (registered trademark). As a result, even when the OS is restarted, the CPU, the memory, and the host IF are not initialized. Therefore, the data stored in the non-OS management area of the memory is retained, and the operation of the host IF can be continued.

After the OS is restarted, the OS update process program 300 makes the storage control program information storage area 207 accessible again by the virtual address in the CPU 123 of the controller 121 (step S305). In other words, the virtual address is allocated to the storage control program information storage area 207 by execution of an mmap command or the like of the OS.

Next, the OS update process program 300 resumes the storage control program using the data such as the storage control program management information or the like held in the storage control program information storage area 207 (step S306).

Next, the OS update process program 300 resumes, in the controller 101, the host IO process taken over to the controller 121 in step S301 (step S307). Details of the host IO resumption process will be described later.

As described above, the controller 121 can quickly resume the operation of the storage control program while continuing the host IO process, compared to the case of performing the OS restart process associated with the initialization of the hardware that cannot continue the host IO process.

Figure 4:
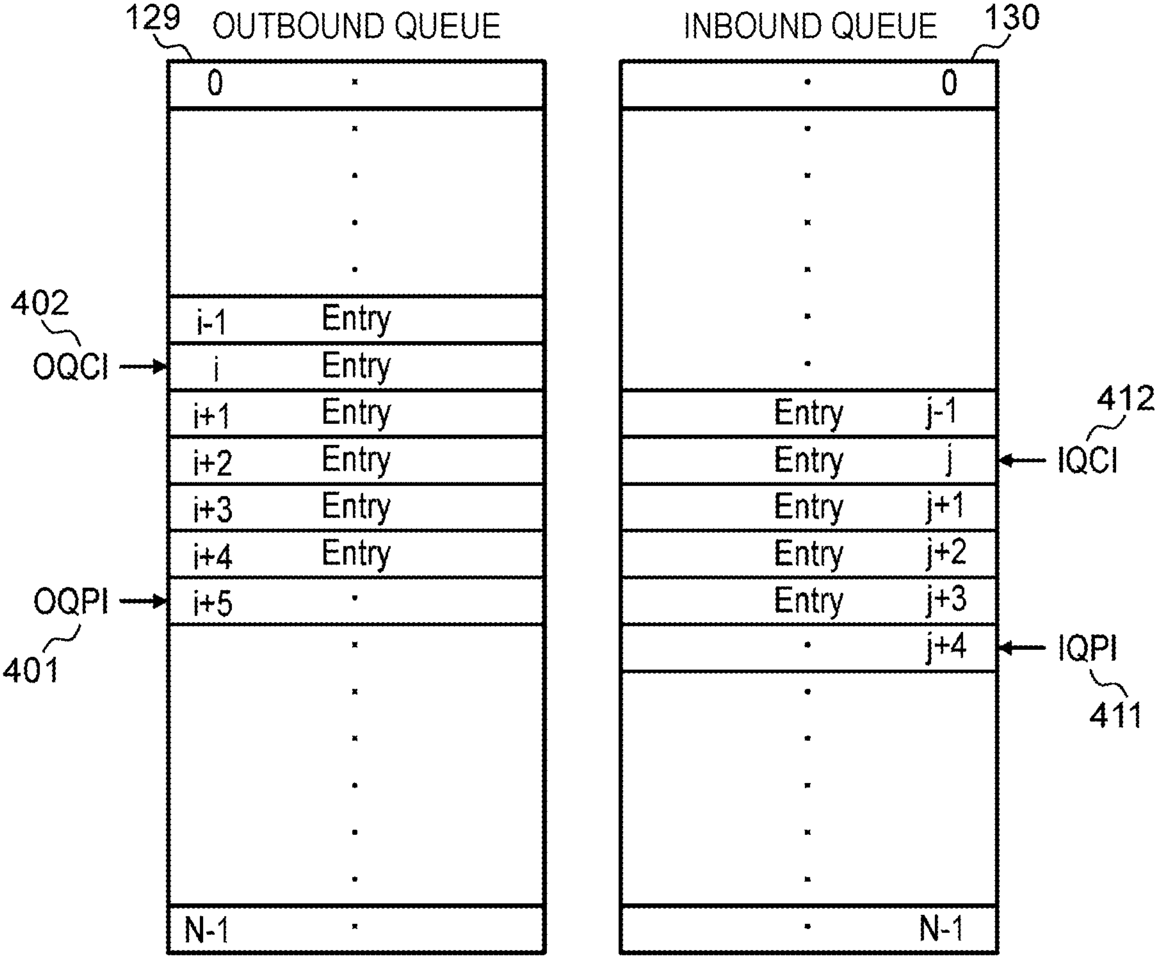
FIG. 4 is a diagram showing a configuration example of an outbound queue (OQ) and an inbound queue (IQ)

FIG. 4 is a diagram showing a configuration example of the OQ and IQ in the storage device 100. As an example, the OQ 129 and the IQ 130 will be described, but the same applies to configurations of other OQ and IQ, such as the OQ 109 and the IQ 110.

Both the OQ 129 and the IQ 130 store entries in a total of N elements, numbered 0 through N−1. In the OQ 129, the content of the entry is, for example, a host IO command received from the host device. In the IQ 130, the content of the entry is, for example, a response corresponding to a completed host IO command or a data transfer list instructed by the CPU to the host IF. Each entry includes exchange identification information (i.e., exchange ID) indicating which exchange of the host IO the entry relates to. The exchange indicates a series of work related to a read operation, a write operation, and the like between the host and the storage.

In the OQ 129 of FIG. 4, as an example, entries are stored in i−1st to i+4th elements. The other elements of OQ 129 are empty. An optimum quality performance index (OQPI) (producer index) 401 indicates the location of the element where the host IF stores the next entry. A consumer index (OQCI) 402 indicates the location of the element where the next entry to be read by the CPU is stored. When the OQPI 401 and the OQCI 402 indicate the same element, no unprocessed entry is stored in the OQ 129, indicating an empty state. In the i−1st element, the latest entry that has been processed is stored. By examining the exchange ID of this entry, the CPU can determine which exchange the entry associated with has been processed.

In the IQ 130 of FIG. 4, as an example, entries are stored in j−1st to i+3th elements. The other elements of the IQ 130 are empty. An IQPI 411 indicates the location of the element where the CPU stores the next entry. An IQCI 412 indicates the location of the element where the next entry to be read by the host IF is stored. When the IQPI 411 and the IQCI 412 indicate the same element, no unprocessed entry is stored in the IQ 130, indicating an empty state. In the j−1st element, the latest entry that has been processed is stored. By examining the exchange ID of this entry, the CPU can determine which exchange the entry associated with has been processed.

The queue indexes OQPI, OQCI, IQPI, IQCI are stored in predetermined addresses in the memory, registers in the host IF, or both, as needed.

Figure 5:
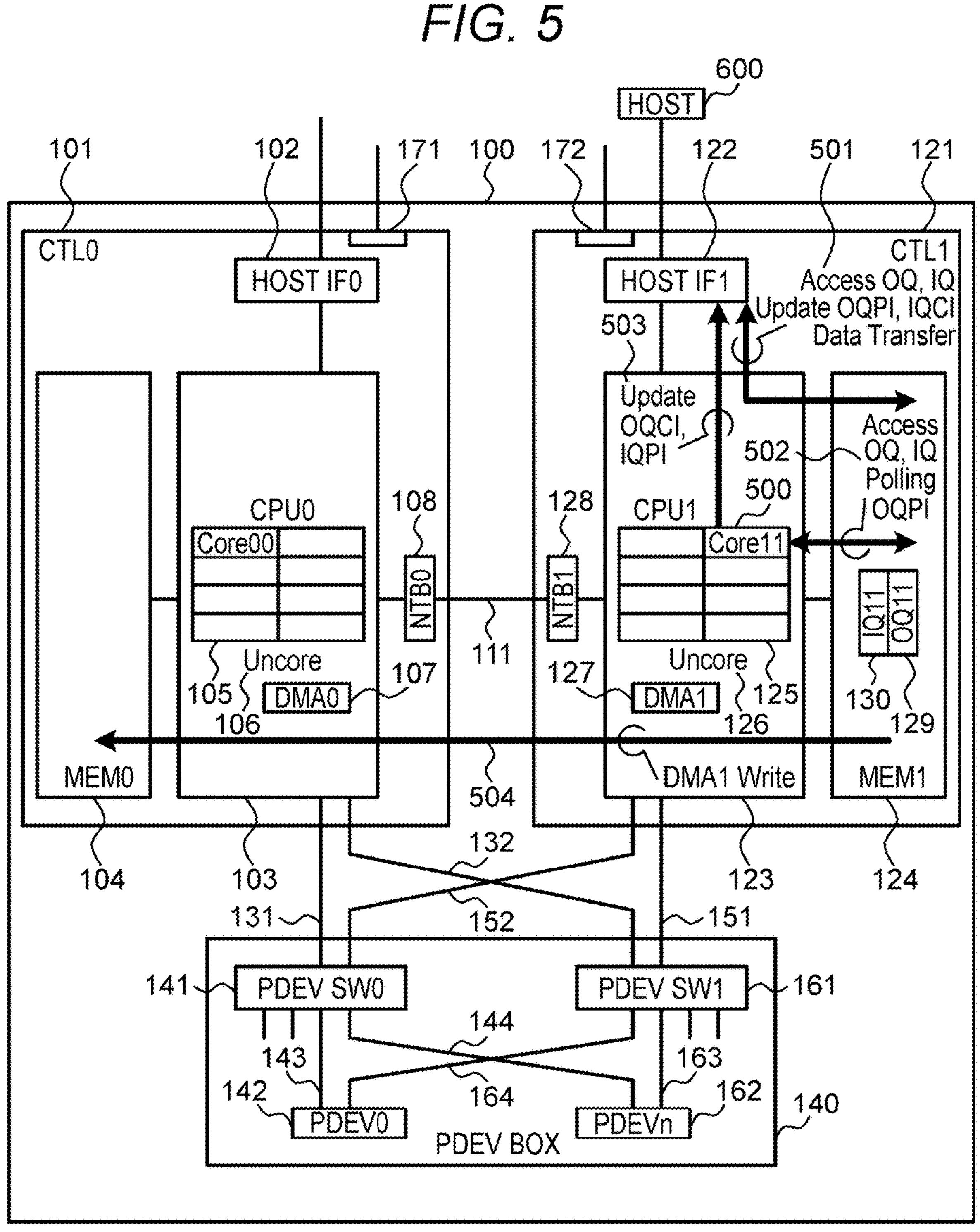
FIG. 5 is a diagram showing data transfer paths related to a host IO process before a host IO is taken over.

FIG. 5 is a diagram for describing data transfer paths related to the host IO process before the host IO is taken over in the storage device 100. In the example shown in the figure, the management terminal 174 and the like shown in FIG. 1 are omitted (the same applies to the following description). As an example, data transfer paths when a core 500 of the CPU 123 controls the host IF 122 in the controller 121 will be described.

The host IF 122 that receives the host IO from the host device 600 accesses the OQ 129 and the IQ 130 in the memory 124 and the OQPI and the IQCI that are the queue indexes thereof via a data transfer path 501 passing through the CPU 123.

The host IF 122 stores the data received from the host device 600 in the memory 124 or transmits data stored in the memory 124 to the host device 600 via the data transfer path 501.

The core 500 accesses the OQ 129 in the memory 124, an OQPI that is the queue index thereof, and the IQ 130 via a data transfer path 502.

The core 500 also accesses the OQCI that is the queue index of the OQ 129 in the host IF 122 and the IQPI that is the queue index of the IQ 130 via a data transfer path 503.

The core 500 transfers data received from the host device 600 and stored in the memory 124 from the memory 124 to the memory 104 of the controller 101 via a data transfer path 504 passing through the CPU 123, the inter-controller link 111, and the CPU 103 using the DMA 127. As a result, the data received from the host device 600 can be duplicated in the memory 104 of the controller 101 and the memory 124 of the controller 121 (the host data duplication process described above).

Figure 6:
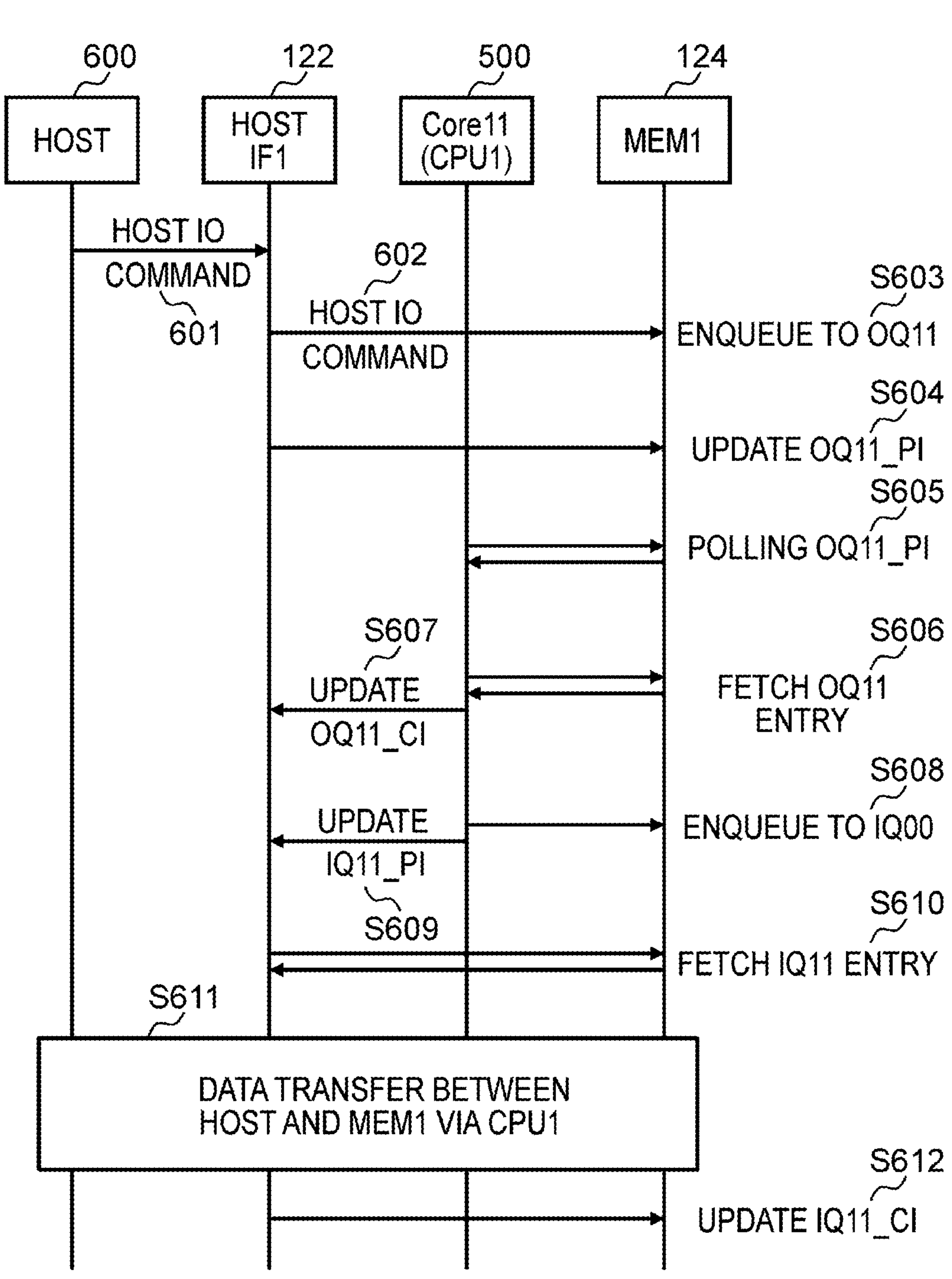
FIG. 6 is a diagram showing a data transfer sequence related to the host IO process before the host IO is taken over.

FIG. 6 is a diagram for describing a data transfer sequence related to the host IO process before the host IO is taken over.

Here, as an example, a case where the host IF 122 and the core 500 of the CPU 123 use the OQ 129 and the IQ 130 in the memory 124 will be described. In FIG. 6, the OQ 129 is indicated as "OQ 11", and the IQ 130 is indicated as "IQ 11".

First, the host device 600 transmits a host IO command 601 to the host IF 122.

Upon receiving the host IO command 601, the host IF 122 enqueues an entry 602 including the command content into the OQ 129 (step S603).

Next, the host IF 122 updates the OQPI of the OQ 129 in the memory 124 to notify the core 500 that the entry 602 has been enqueued into the OQ 129 (step S604).

The core 500 checks the presence or absence of an unprocessed entry in the OQ 129 by polling the OQPI of the OQ 129 (step S605). When there is an unprocessed entry, the core 500 reads the entry storing the content of the host IO command from the OQ 129 (step S606). Furthermore, the core 500 updates the OQCI of the OQ 129 in the host IF 122 (step S607).

Next, the core 500 enqueues an entry including a data transfer list corresponding to the host IO command 601 into the IQ 130 (step S608). Moreover, the core 500 updates the IQPI of the IQ 130 in the host IF 122 (step S609).

The host IF 122 with the updated IQPI reads the entry including the data transfer list from the IQ 130 (step S610).

Subsequently, the host IF 122 performs data transfer between the host device 600 and the memory 124 according to the data transfer list included in the entry read from the IQ 130 (step S611).

When the data transfer is completed, the host IF 122 updates the IQCI of the IQ 130 in the memory 124 (step S612).

In this manner, the core 500 can process the host IO command 601 received by the host IF 122.

Figure 7:
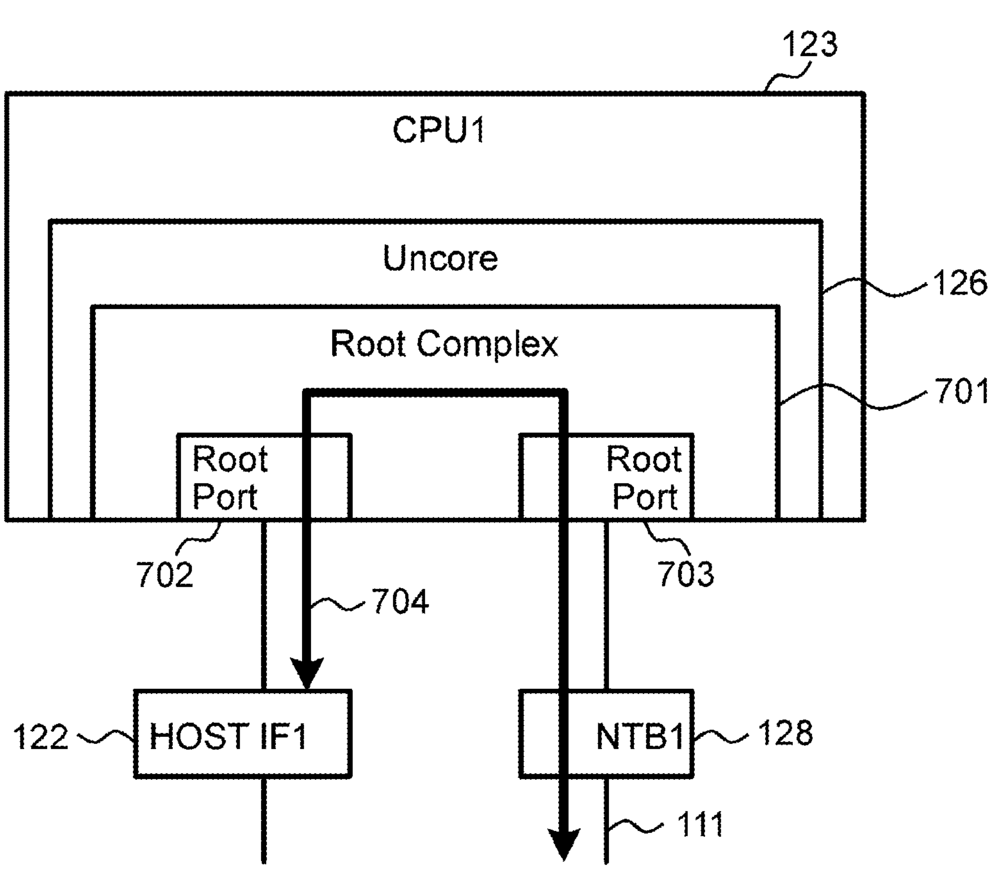
FIG. 7 is a diagram showing an example of a P2P data transfer path.

FIG. 7 is a diagram showing an example of a peer-to-peer (P2P) data transfer path in the CPU 123.

The uncore 126 of the CPU 123 includes a PCIe root complex 701. The root complex 701 further includes a plurality of root ports including root ports 702, 703. The root port 702 is connected to the host IF 122, and the root port 703 is connected to the NTB 128. As shown in FIG. 1, the NTB 128 is connected to another controller 101 via the inter-controller link 111. Data transfer performed by a path 704 passing through the root port 702, the root complex 701, and the root port 703 is referred to as P2P data transfer.

Figure 8:
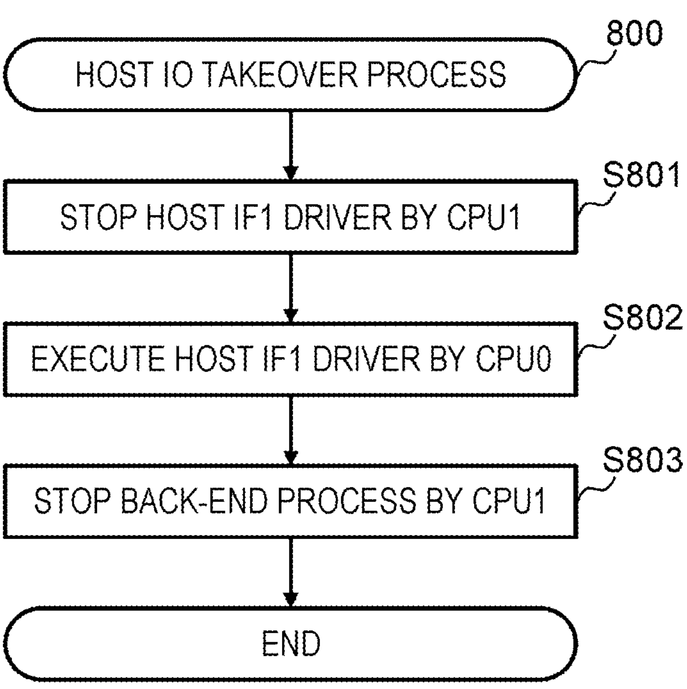
FIG. 8 is a flowchart showing an example of a procedure for a host IO takeover process.

FIG. 8 is a flowchart showing an example of the procedure for the host IO takeover process between the controllers in the storage device 100. This process flow is executed in step S301 of the OS update process program 300 of FIG. 3. Alternatively, this process flow is executed by the CPU 103 or the CPU 123 of the controller that has received an instruction for the host IO takeover from the management terminal 174. Hereinafter, this process flow will be referred to as a host IO takeover process program 800. As an example, a case where the controller 101 takes over the host IO process from the controller 121 will be described.

First, the host IO takeover process program 800 stops, by the CPU 123 of the controller 121, a host IF 122 driver being executed (step S801). Stopping the host IF driver here refers to stopping the process for the host IF control queue. Therefore, even when the host IF driver is stopped, the host IF is not initialized, preventing the occurrence of host link down and the like.

Next, the host IO takeover process program 800 causes the CPU 103 of the controller 101 to execute the host IF 122 driver (step S802). Executing the host IF driver here refers to starting processing for the control queue of the host IF. Therefore, even when the host IF driver is executed, the host IF is not initialized, preventing the occurrence of host link down and the like. The host IF 122 driver operating on the CPU 103 can take over the host IO process of the host IF 122 driver executed by the CPU 123 by examining the queue indexes of the OQ 129 and the IQ 130. In other words, even if the subject operating the host IF control queue changes, the host IF can continue the operation.

Next, the host IO takeover process program 800 stops, by the CPU 123 of the controller 121, the back-end process being executed (step S803). Since the data received from the host device has been duplicated in the memory 104 and the memory 124, even when the back-end process of the CPU 123 is stopped, the operation of the storage device 100 can be continued as long as the CPU 103 executes the back-end process.

As described above, the host IO process is taken over from the controller 121 to the controller 101.

Figure 9:
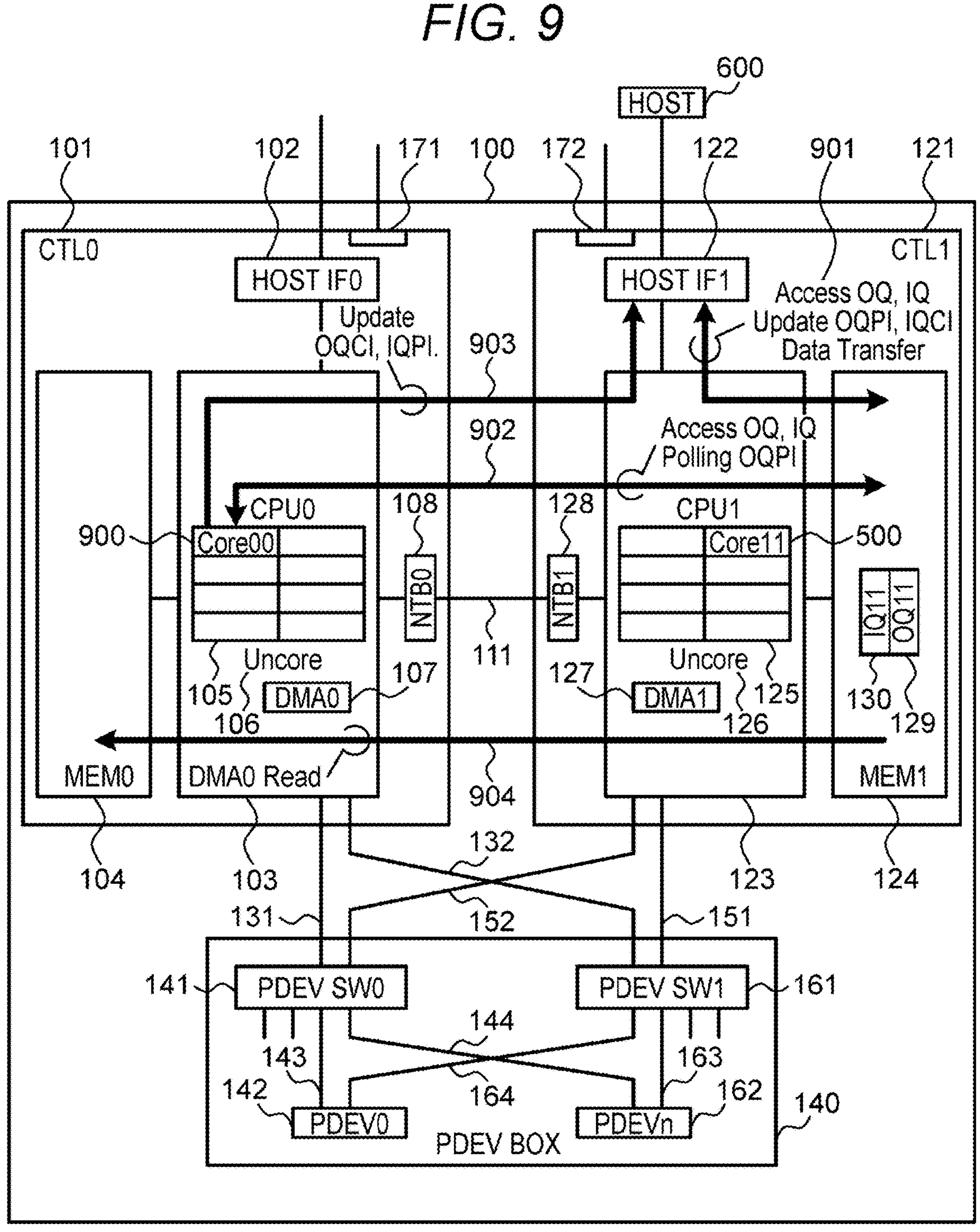
FIG. 9 is a diagram showing data transfer paths related to the host IO process after the host IO is taken over.

FIG. 9 is a diagram showing data transfer paths related to the host IO process after the host IO is taken over in the storage device 100. As an example, data transfer paths when a core 900 of the CPU 103 belonging to the controller 101 controls the host IF 122 of the controller 121 will be described.

The host IF 122 that receives the host IO from the host device 600 accesses the OQ 129 and the IQ 130 in the memory 124 and the OQPI and the IQCI that are the queue indexes thereof via a data transfer path 901 passing through the CPU 123.

The host IF 122 stores the data received from the host device 600 in the memory 124 or transmits data stored in the memory 124 to the host device 600 via a data transfer path 901.

The core 900 accesses the OQ 129 in the memory 124, the OQPI that is the queue index thereof, and the IQ 130 via a data transfer path 902 passing through the inter-controller link 111 and the CPU 123.

The core 900 also accesses the OQCI that is the queue index of the OQ 129 in the host IF 122 and the IQPI that is the queue index of the IQ 130 via the inter-controller link 111 and a data transfer path 903 passing through the CPU 123. The data transfer path 903 includes a P2P data transfer path in the CPU 123.

The core 900 transfers data received from the host device 600 and stored in the memory 124 from the memory 124 to the memory 104 of the controller 101 via a data transfer path 904 passing through the CPU 123, the inter-controller link 111, and the CPU 103 using the DMA 107. As a result, the data received from the host device 600 can be duplicated in the memory 104 of the controller 101 and the memory 124 of the controller 121 (the host data duplication process described above).

Figure 10:
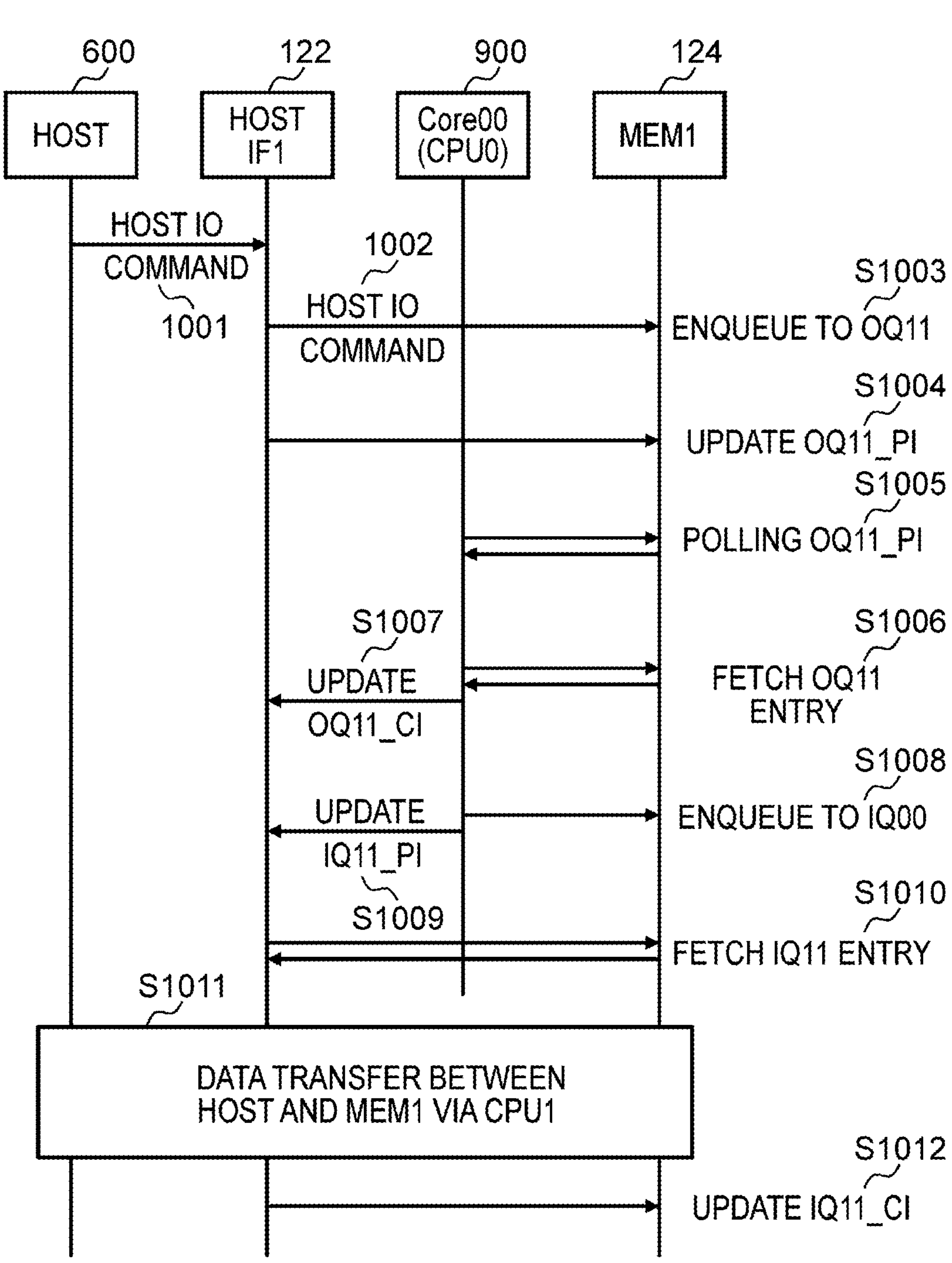
FIG. 10 is a diagram showing a data transfer sequence related to the host IO process after the host IO is taken over.

FIG. 10 is a diagram showing a data transfer sequence related to the host IO process after the host IO is taken over in the storage device 100.

Here, as an example, a case where the host IF 122 and the core 900 of the CPU 103 use the OQ 129 and the IQ 130 in the memory 124 will be described. In FIG. 10, the OQ 129 is indicated as "OQ 11", and the IQ 130 is indicated as "IQ 11".

First, the host device 600 transmits a host IO command 1001 to the host IF 122.

Upon receiving the host IO command 1001, the host IF 122 enqueues an entry 1002 including the command content into the OQ 129 (step S1003).

Next, the host IF 122 updates the OQPI of the OQ 129 in the memory 124 to notify the core 900 that the entry 1002 has been enqueued into the OQ 129 (step S1004).

The core 900 checks the presence or absence of an unprocessed entry in the OQ 129 by polling the OQPI of the OQ 129 (step S1005). When there is an unprocessed entry, the core 900 reads the entry storing the content of the host IO command from the OQ 129 (step S1006). Furthermore, the core 900 updates the OQCI of the OQ 129 in the host IF 122 (step S1007).

Next, the core 900 enqueues an entry including a data transfer list corresponding to the host IO command 1001 into the IQ 130 (step S1008). Furthermore, the core 900 updates the IQPI of the IQ 130 in the host IF 122 (step S1009).

The host IF 122 with the updated IQPI reads the entry including the data transfer list from the IQ 130 (step S1010).

Subsequently, the host IF 122 performs data transfer between the host device 600 and the memory 124 according to the data transfer list included in the entry read from the IQ 130 (step S1011).

When the data transfer is completed, the host IF 122 updates the IQCI of the IQ 130 in the memory 124 (step S1012). In this manner, the core 900 can process the host IO command 1001 received by the host IF 122.

Figure 11:
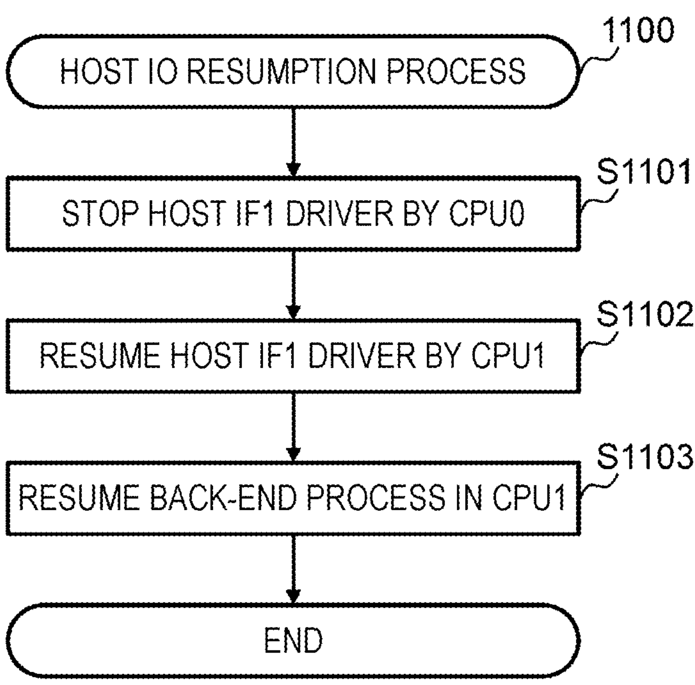
FIG. 11 is a flowchart showing an example of a procedure for a host IO resumption process.

FIG. 11 is a flowchart showing an example of a procedure for resuming the host IO process in the controller that has taken over the host IO process to the other controller for the update and restart processes for the controller OS in the storage device 100. This process flow is executed in step S307 of the OS update process program 300 of FIG. 3. Alternatively, this process flow is executed by the CPU 103 or the CPU 123 of the controller that has received an instruction for the host IO resumption process from the management terminal 174. Hereinafter, this process flow will be referred to as a host IO resumption process program 1100. As an example, a case where the controller 101 resumes the host IO process after the controller 121 has taken over the host IO process from the controller 121 will be described.

First, the host IO resumption process program 1100 stops, by the CPU 103 of the controller 101, the host IF 122 driver being executed (step S1101). Stopping the host IF driver here refers to stopping the process for the host IF control queue. Therefore, even when the host IF driver is stopped, the host IF is not initialized, preventing the occurrence of host link down and the like.

Next, the host IO resumption process program 1100 resumes the host IF 122 driver by the CPU 123 of the controller 121 (step S1102). Restarting the host IF driver here refers to restarting processing for the control queue of the host IF. Therefore, even when the host IF driver is resumed, the host IF is not initialized, so that a host link down or the like does not occur. The host IF 122 driver operating on the CPU 123 can take over the host IO process of the host IF 122 driver executed by the CPU 103 by examining the queue indexes of the OQ 129 and the IQ 130. In other words, even if the subject operating the host IF control queue changes, the host IF can continue the operation.

Next, the host IO resumption process program 1100 resumes the back-end process in the CPU 123 of the controller 121 (step S1103). As described above, the host IO process is taken over from the controller 101 to the controller 121.

The OS update procedure in the present embodiment described above is summarized as follows. As an example, in the storage device 100 with the dual controller configuration, it is assumed that the controller 121 is subject to the OS update and the controller 101 is not subject to the OS update. The storage control program information storage area 207 including the control queue and management information on the host IF is placed in the non-OS management area 204.

First, the OS update process program 300 of the storage device 100 transfers the host IO process of the controller 121 from the core 500 of the CPU 123 of the controller 121 to the core 900 of the CPU 103 of the controller 101. The CPU 103 of the controller 101 accesses the host IF 122 of the controller 121 via the inter-controller link 111 and the P2P data transfer path of the CPU 123 to control the host IO process.

Furthermore, in the OS update process program 300, the back-end process in the controller 121 is not performed by the CPU 123 of the controller 121, but is performed by the CPU 103 of the controller 101.

Next, the OS update process program 300 makes the storage control program information storage area 207 inaccessible by the virtual address.

Then, the CPU 123 of the controller 121 that has stopped performing the host IO process and the back-end process performs the OS update process and the restart process without initializing the hardware including the CPU 123, the host IF 122, and the memory 124. During the process, the CPU 103 of the controller 101 continues the host IO process of the host IF 122 of the controller 121. Moreover, the CPU 103 of the controller 101 performs the host data duplication process of duplicating data received from the host device 600 with the memory 104 of the controller 101 and the memory 124 of the controller 121.

After the OS is restarted, the OS update process program 300 makes the storage control program information storage area 207 accessible by the virtual address.

Then, the OS update process program 300 causes the core 900 of the CPU 103 of the controller 101 to resume the host IO process of the host IF 122 taken over by the core 500 of the CPU 123 of the controller 121.

As described above, the storage device 100 according to the present embodiment can execute the OS update process and the restart process while maintaining the availability of the dual controller and data redundancy.

When the controller 121 is subject to the OS update and the controller 101 is not subject to the OS update, the OS update process program 300 may perform control so that the host IO process of the controller 101 is taken over from the core 900 of the CPU 103 of the controller 101 to the core 500 of the CPU 123 of the controller 121.

The storage device 100 according to the present embodiment includes: the controller 121 (first controller) including the CPU 123 (first processor) that controls a data input/output process according to a request from the host device via the host interface that controls a protocol of communication with the host device and the memory 124 (first memory) having the storage area used by the CPU 123; at least one controller 101 (second controller) including the CPU 103 (second processor) that controls the data input/output process according to the request from the host device via the host interface that controls the protocol of communication with the host device and the memory 104 (second memory) having the storage area used by the CPU 103; and the inter-controller link 111 that connects the controller 121 and the controller 101. At least the CPU 123 executes an operating system and a storage control program that controls the data input/output process according to the request from the host device. The storage control program executes: a step of allocating a virtual address to the non-OS management area 204 (first predetermined area) in the memory 124 to which the operating system does not allocate the virtual address, and placing, in the non-OS management area 204, a first control queue in which data of an input/output process via the host interface is temporarily stored; a takeover step of taking over the input/output process from the CPU 123 to the CPU 103 and releasing the allocation of the virtual address to the non-OS management area 204 when a restart process of restarting the operating system is executed; a restart step of executing the restart process of restarting the operating system without initializing the non-OS management area 204 on hardware used by the operating system; and a process resumption step of reallocating the virtual address to the non-OS management area 204 and resuming the input/output process by the CPU 123 after the restart process is finished.

In this way, even when one controller 121 of the plurality of controllers 101, 121 is stopped by the restart process associated with the update process for the operating system, the IO request from the host device can be continuously processed by performing the takeover from the CPU 123 of one controller 121 to the CPU 103 of the other controller 101. In addition, in this way, the data received from the host device can be duplicated to ensure reliability.

The CPU 103 is an example of a second processor, and accesses the host interface via a data transfer path passing through the inter-controller link 111. The data transfer path includes a data transfer path passing between two ports included in the CPU 123 (first processor). The CPU 103 accesses the OQ 109 and the IQ 110 as an example of the first control queue via a data transfer path passing through the inter-controller link 111.

The CPU 123 includes the DMA 127, and the CPU 103 includes the DMA 107. Before the input/output process is taken over from the CPU 123 to the CPU 103, the data received from the host device is duplicated by data transfer from the memory 124 (first memory) to the memory 104 (second memory) by the DMA 127 of the CPU 123. After the input/output process is taken over from the PU123 to the CPU 103, the data received from the host device is duplicated by data transfer from the memory 124 (first memory) to the memory 104 by the DMA 107 of the CPU 103. In this way, before and after the takeover described above, the IO request from the host device can be continuously processed, and reliability can be enhanced.

When executing the restart process for the operating system, the storage control program stops the process of the CPU 123 writing the data received from the host device and stored in the memory 124 (first memory) into a storage medium. In this way, reliability can be ensured.

(2) Second Embodiment

A storage device according to a second embodiment will be described with reference to FIGS. 12 to 15. The configuration of the storage device according to the second embodiment is similar to that of the storage device according to the first embodiment shown in FIGS. 1 to 11 except for differences described below. Therefore, the description of similar points will be omitted. As the process of restarting the OS of the controller of the storage device at arbitrary timing, the present embodiment will also be described by taking a process of restarting the OS associated with the update process for the OS of the controller as an example, but the present invention is not limited thereto. For example, the OS of the controller of the storage device may be restarted when the administrator of the storage device determines that it is necessary.

Figure 12:
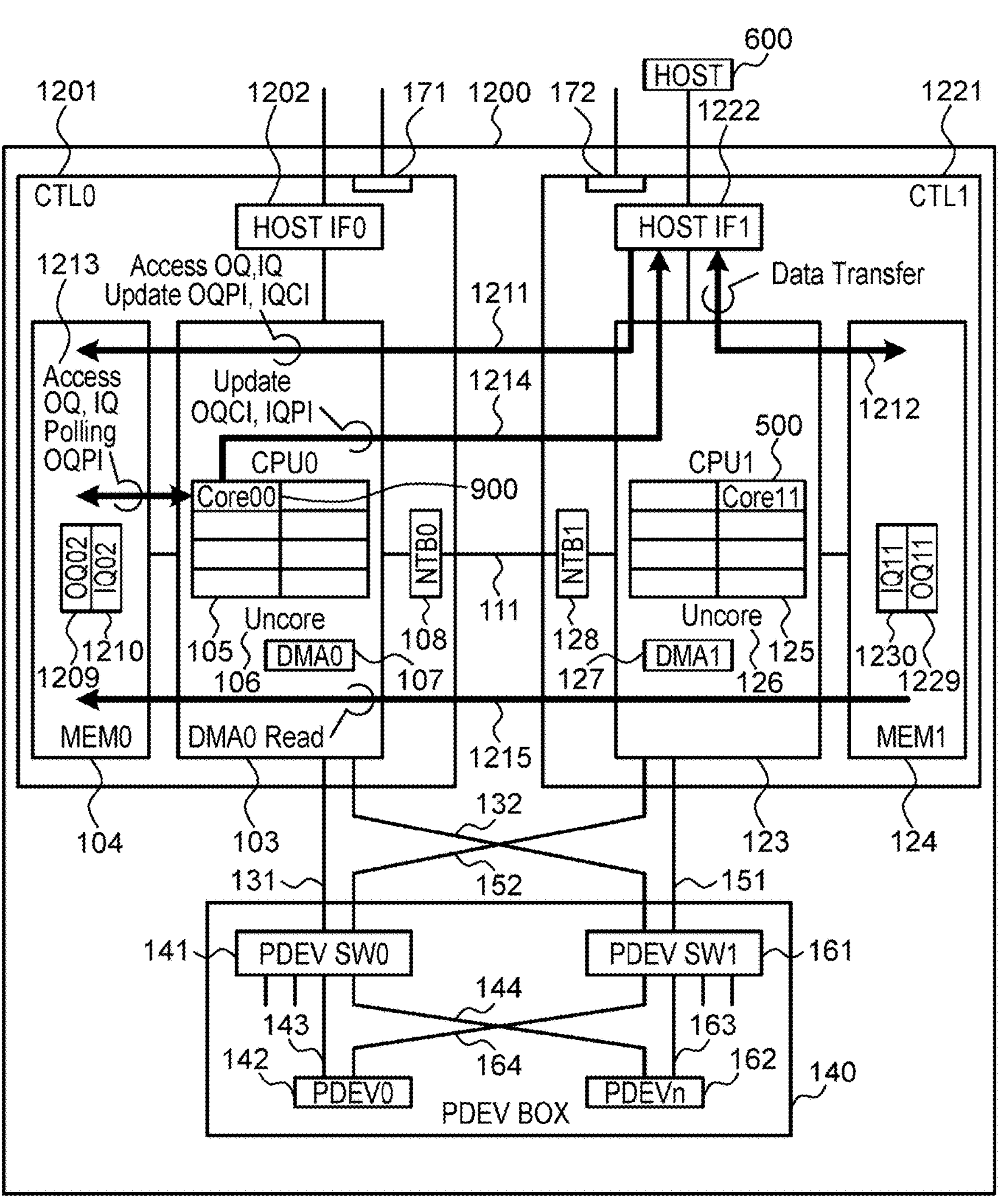
FIG. 12 is a diagram showing data transfer paths related to the host IO process after a host IO is taken over in a storage device according to a second embodiment.

FIG. 12 is a diagram showing data transfer paths related to the host IO process after the host IO is taken over in a storage device 1200. Here, similarly to the storage device 100 according to the first embodiment, it is assumed that the host IO received by a host IF 1222 is taken over from a controller 1221 to a controller 1201.

The storage device 1200 has the same configuration as the storage device 100 except for the controllers 1201, 1221. The controllers 1201, 1221 have the same configuration as the controllers 101, 121 except for the host IFs 1202, 1222.

The host IFs 1202, 1222 differ from the host IFs 102, 122 in that a different set of OQ and IQ is allocated to each of the cores of the CPUs that control the host IFs. For example, when the core 500 of the CPU 123 controls the host IF 1222, an OQ 1229 and an IQ 1230 in the memory 124 are used. In contrast, when the core 900 of the CPU 103 controls the host IF 1222, an OQ 1209 and an IQ 1210 in the memory 104 are used. Then, according to an instruction from the CPU 103 or the CPU 123 to the host IF 1222, the host IF 1222 determines which OQ and IQ pair to access.

As an example, data transfer paths when the core 900 of the CPU 103 belonging to the controller 1201 controls the host IF 1222 of the controller 1221 will be described.

The host IF 1222 that receives the host IO from the host device 600 accesses the OQ 1209 and the IQ 1210 in the memory 104 and the OQPI and the IQCI that are the queue indexes thereof via a data transfer path 1211 passing through the CPU 123, the inter-controller link 111, and the CPU 103. The data transfer path 1211 includes a P2P data transfer path in the CPU 123.

The host IF 1222 stores the data received from the host device 600 in the memory 124 or transmits data stored in the memory 124 to the host device 600 via a data transfer path 1212.

The core 900 accesses the OQ 1209 in the memory 104, an OQPI that is the queue index thereof, and the IQ 1210 via the data transfer path 1213.

The core 900 also accesses the OQCI that is the queue index of the OQ 1209 in the host IF 1222 and the IQPI that is the queue index of the IQ 1210 via the inter-controller link 111 and a data transfer path 1214 passing through the CPU 123. The data transfer path 1214 includes the P2P data transfer path in the CPU 123.

The core 900 transfers data received from the host device 600 and stored in the memory 124 from the memory 124 to the memory 104 of the controller 101 via a data transfer path 1215 passing through the CPU 123, the inter-controller link 111, and the CPU 103 using the DMA 107. As a result, the data received from the host device 600 can be duplicated in the memory 104 of the controller 1201 and the memory 124 of the controller 1221 (the host data duplication process described above).

Data transfer paths when the core 500 of the CPU 123 belonging to the controller 1221 controls the host IF 1222 of the controller 1221 are similar to those in FIG. 5. Therefore, the description thereof will be omitted.

Figure 13:
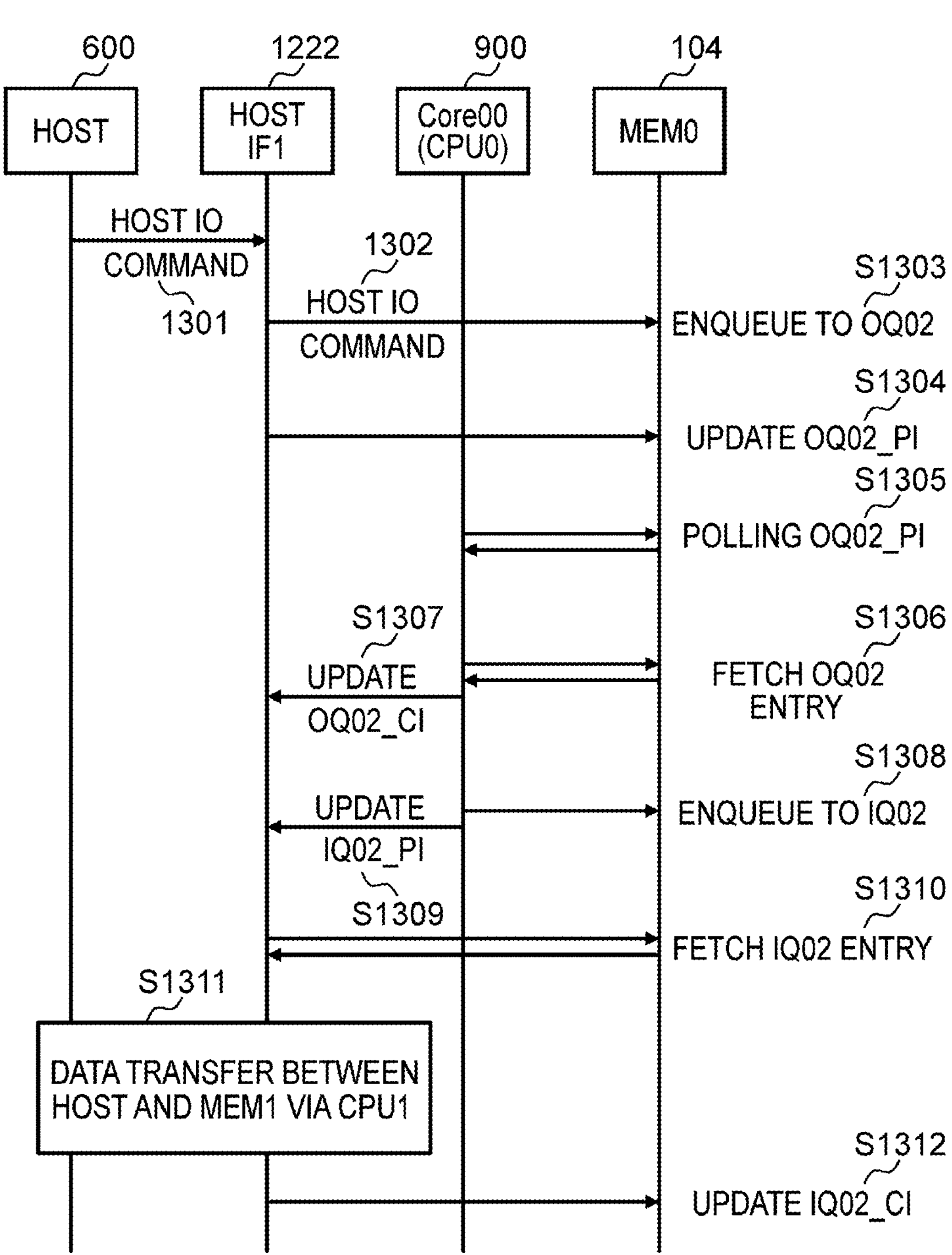
FIG. 13 is a diagram showing a data transfer sequence related to the host IO process after the host IO is taken over.

FIG. 13 is a diagram showing a data transfer sequence related to the host IO process after the host IO is taken over in the storage device 1200.

Here, as an example, a case where the host IF 1222 and the core 900 of the CPU 103 use the OQ 1209 and the IQ 1210 in the memory 104 will be described. In FIG. 13, the OQ 1209 is indicated as "OQ 02", and the IQ 1210 is indicated as "IQ 02".

First, the host device 600 transmits a host IO command 1301 to the host IF 1222. Upon receiving the host IO command 1301, the host IF 1222 enqueues an entry 1302 including the command content into the OQ 1209 (step S1303).

Next, the host IF 1222 updates the OQPI of the OQ 1209 in the memory 104 to notify the core 900 that the entry 1302 has been enqueued into the OQ 1209 (step S1304).

The core 900 checks the presence or absence of an unprocessed entry in the OQ 1209 by polling the OQPI of the OQ 1209 (step S1305). When there is an unprocessed entry, the core 900 reads the entry storing the content of the host IO command from the OQ 1209 (step S1306). Furthermore, the core 900 updates the OQCI of the OQ 1209 in the host IF 1222 (step S1307).

Next, the core 900 enqueues an entry including a data transfer list corresponding to the host IO command 1301 into the IQ 1210 (step S1308). Moreover, the core 900 updates the IQPI of the IQ 1210 in the host IF 1222 (step S1309).

The host IF 1222 with the updated IQPI reads the entry including the data transfer list from the IQ 1210 (step S1310).

Subsequently, the host IF 1222 performs data transfer between the host device 600 and the memory 124 according to the data transfer list included in the entry read from the IQ 1210 (step S1311).

When the data transfer is completed, the host IF 1222 updates the IQCI of the IQ 1210 in the memory 104 (step S1312). In this manner, the core 900 of the CPU 103 can process the host IO command 1301 received by the host IF 1222.

Figure 14:
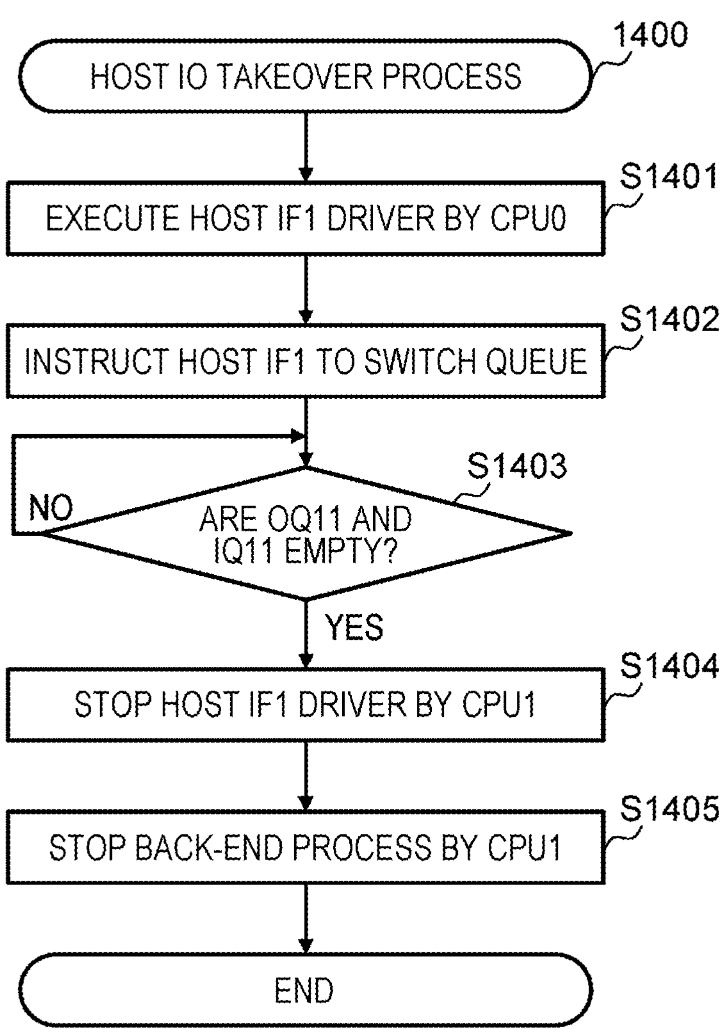
FIG. 14 is a flowchart showing an example of the procedure for the host IO takeover process.

FIG. 14 is a flowchart showing an example of a procedure for a host IO takeover process between the controllers in the storage device 1200. This process flow is executed in step S301 of the OS update process program 300 of FIG. 3. Alternatively, this process flow is executed by the CPU 103 or the CPU 123 of the controller that has received an instruction for the host IO takeover from the management terminal. Hereinafter, this process flow will be referred to as a host IO takeover process program 1400. As an example, a case where the controller 1201 takes over the host IO process from the controller 1221 will be described.

First, the host IO takeover process program 1400 execute the host IF 1222 driver by the CPU 103 of the controller 1201 (step S1401). At this time, the OQ 1209 and the IQ 1210 are in an empty state, and the host IO process using these is not yet performed. Executing the host IF driver here refers to starting processing for the control queue of the host IF. Therefore, even when the host IF driver is executed, the host IF is not initialized, preventing the occurrence of host link down and the like.

Next, the host IO takeover process program 1400 instructs the host IF 1222 to switch the queue (step S1402). The host IF 1222 before receiving the queue switching instruction enqueues an entry related to the host IO command received from the host device into the OQ 1229. After receiving the queue switching instruction, the host IF 1222 enqueues entries related to subsequently received host IO commands, which are assigned new exchange IDs, into the OQ 1209 based on the host IO commands. While an uncompleted entry remains in the OQ 1229, the host IO process related to the OQ 1229 and the IQ 1230 and the host IO process related to the OQ 1209 and the IQ 1210 are executed in parallel. After the queue switching instruction, an entry is not newly enqueued into the OQ 1229, and thus, there is no uncompleted entry in the OQ 1229 and the IQ 1230 in due course.

Next, the host IO takeover process program 1400 waits until the OQ 1229 and the IQ 1230 become empty (step S1403: No). When the OQ 1229 and the IQ 1230 become empty (step S1403: Yes), the host IO takeover process program 1400 proceeds to step S1404.

Next, the host IO takeover process program 1400 stops, by the CPU 123 of the controller 1221, a host IF 1222 driver being executed (step S1404). Stopping the host IF driver here refers to stopping the process for the host IF control queue. Therefore, even when the host IF driver is stopped, the host IF is not initialized, preventing the occurrence of host link down and the like.

Next, the host IO takeover process program 1400 stops, by the CPU 123 of the controller 1221, the back-end process being executed (step S1405). Since the data received from the host device has been duplicated in the memories 104, 124, even when the back-end process of the CPU 123 is stopped, the operation of the storage device 1200 can be continued as long as the CPU 103 executes the back-end process. As described above, the host IO process is taken over from the controller 1221 to the controller 1201.

Figure 15:
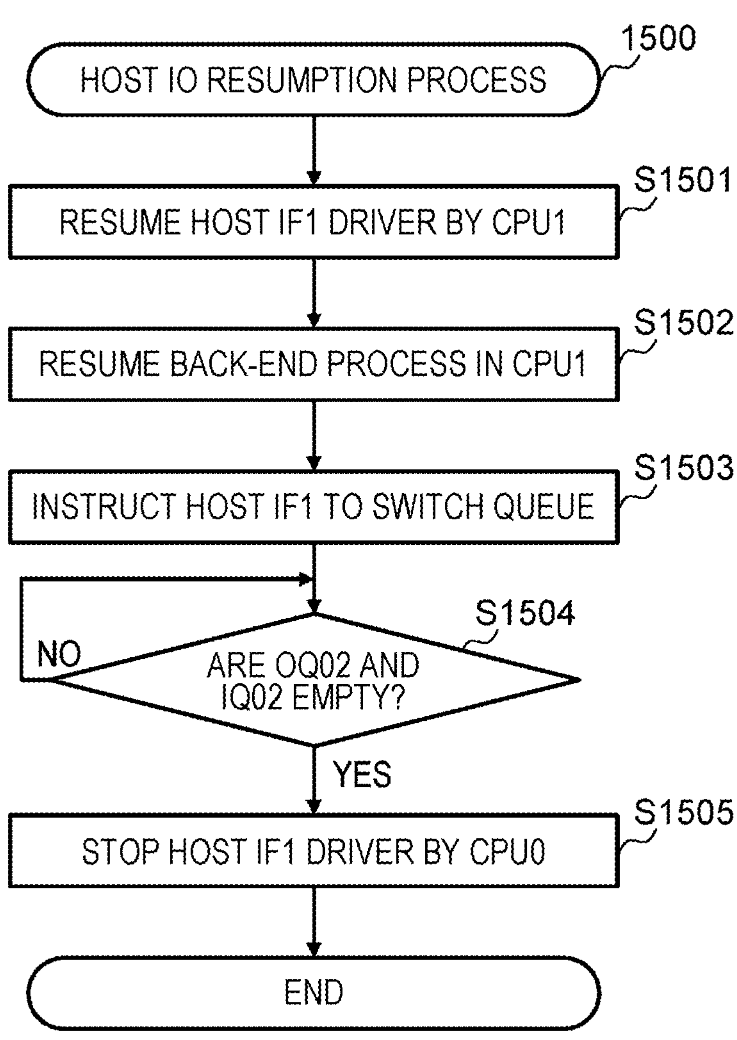
FIG. 15 is a flowchart showing an example of the procedure for the host IO resumption process.

FIG. 15 is a flowchart showing an example of a procedure for resuming the host IO process in the controller that has taken over the host IO process to the other controller in the storage device 1200. This process flow is executed in step S307 of the OS update process program 300 of FIG. 3. Alternatively, the process is executed by the CPU 103 or the CPU 123 of the controller that has received an instruction for the host IO resumption process from the management terminal. Hereinafter, this process flow will be referred to as a host IO resumption process program 1500. As an example, a case where the controller 1201 resumes the host IO process after the controller 1221 has taken over the host IO process of the controller 1221 will be described.

First, the host IO resumption process program 1500 resumes the host IF 1222 driver by the CPU 123 of the controller 1221 (step S1501). At this time, the OQ 1229 and the IQ 1230 are in an empty state, and the host IO process using these is not yet performed. Restarting the host IF driver here refers to restarting processing for the control queue of the host IF. Therefore, even when the host IF driver is resumed, the host IF is not initialized, so that a host link down or the like does not occur.

Next, the host IO resumption process program 1500 restarts the back-end process in the CPU 123 of the controller 1221 (step S1502).

Next, the host IO resumption process program 1500 instructs the host IF 1222 to switch the queue (step S1503). Before receiving the queue switching instruction, the host IF 1222 enqueues an entry related to the host IO command received from the host machine into the OQ 1209. After receiving the queue switching instruction, the host IF 1222 enqueues entries related to subsequently received host IO commands, which are assigned new exchange IDs, into the OQ 1229 based on the host IO commands. While an uncompleted entry remains in the OQ 1209, the host IO process related to the OQ 1209 and the IQ 1210 and the host IO process related to the OQ 1229 and the IQ 1230 are executed in parallel. After the queue switching instruction, an entry is not newly enqueued into the OQ 1209, and thus, there is no uncompleted entry in the OQ 1209 and the IQ 1210 in due course.

Next, the host IO resumption process program 1500 waits until the OQ 1209 and the IQ 1210 become empty (step S1504: No). When the OQ 1209 and the IQ 1210 become empty (step S1504: Yes), the host IO resumption process program 1500 proceeds to step S1505.

Next, the host IO resumption process program 1500 stops, by the CPU 103 of the controller 1201, the host IF 1222 driver being executed (step S1505). Stopping the host IF driver here refers to stopping the process for the host IF control queue. Therefore, even when the host IF driver is stopped, the host IF is not initialized, preventing the occurrence of host link down and the like. As described above, the host IO process is taken over from the controller 1201 to the controller 1221.

According to the present embodiment, similarly to the storage device 100 according to the first embodiment, it is possible to execute the OS update process and the restart process while maintaining the availability of the dual controller and data redundancy. Continuing the host IO process during the OS restart process can reduce power consumption required to retransmit the input/output request from the host device when the OS restart process is executed.

As described above, the storage device 1200 according to the second embodiment is characterized in including the host IF to which a plurality of sets of OQ and IQ are allocated. As a result, the core 900 of the CPU 103 accesses the OQ 1209 and the IQ 1210 in the memory 104 directly connected to the CPU 103 to control the host IF 1222. The core 500 of the CPU 123 also accesses the OQ 1229 and the IQ 1230 in the memory 124 directly connected to the CPU 123 to control the host IF 1222. Therefore, compared to the case of accessing the OQ and the IQ in the memory of the other controller as in the storage device 100 according to the first embodiment, the time to access the OQ, the IQ, and the queue indexes thereof can be shortened. As a result, the storage device 1200 can reduce the waiting time of the core related to the host IO process and can improve performance compared to the storage device according to the first embodiment.

In the present embodiment, the memory 104 (second memory) includes the OQ 109 and the IQ 110 as an example of the second control queue for the host interface, and the host interface receives a switching instruction that specifies one of the first control queue (OQ 129 and IQ 130) or the second control queue (OQ 109 and IQ 110) as an enqueue destination for a request received from the host device, and switches the control queue as the enqueue destination based on a new request subsequently received from the host device and assigned an identifier for a series of work related to the request. In this way, the same effect as that of the first embodiment can be exerted. By reliably switching the control queue as described above, the IO request from the host device can be continuously processed before and after the takeover, and the data received from the host device can be duplicated to ensure reliability.

When executing the operating system restart process, the storage control program executes a restart process without initializing the non-OS management area 204 (first predetermined area) on hardware used by the operating system after the host interface receives the switching instruction to switch the enqueue destination for the request received from the host device from the first control queue (OQ 129 and IQ 130) to the second control queue (OQ 109 and IQ 110) and after the first control queue (OQ 129 and IQ 130) becomes empty. In this way, the same effect as that of the first embodiment can be exerted. By switching the control queue while confirming that one control queue is empty as described above, the IO request from the host device can be continuously processed before and after the takeover, and the data received from the host device can be duplicated to ensure reliability.

When executing the restart process for the operating system, the storage control program stops the input/output process for the host device executed by the CPU 103 (second processor) after the host interface receives the switching instruction to switch the enqueue destination for the request received from the host device from the second control queue (OQ 109 and IQ 110) to the first control queue (OQ 129 and IQ 130) and after the second control queue becomes empty. In this way, the same effect as that of the first embodiment can be exerted. The IO request from the host device can be continuously processed reliably before and after the takeover, and the data received from the host device can be duplicated to ensure reliability.

(3) Third Embodiment

A storage device according to a third embodiment will be described with reference to FIGS. 16 and 17. The configuration of the storage device according to the third embodiment is similar to that of the storage device according to the first embodiment shown in FIGS. 1 to 11 except for differences described below. Therefore, the description of similar points will be omitted. As the process of restarting the OS of the controller of the storage device at arbitrary timing, the present embodiment will also be described by taking a process of restarting the OS associated with the update process for the OS of the controller as an example, but the present invention is not limited thereto. For example, the OS of the controller of the storage device may be restarted when the administrator of the storage device determines that it is necessary.

Figure 16:
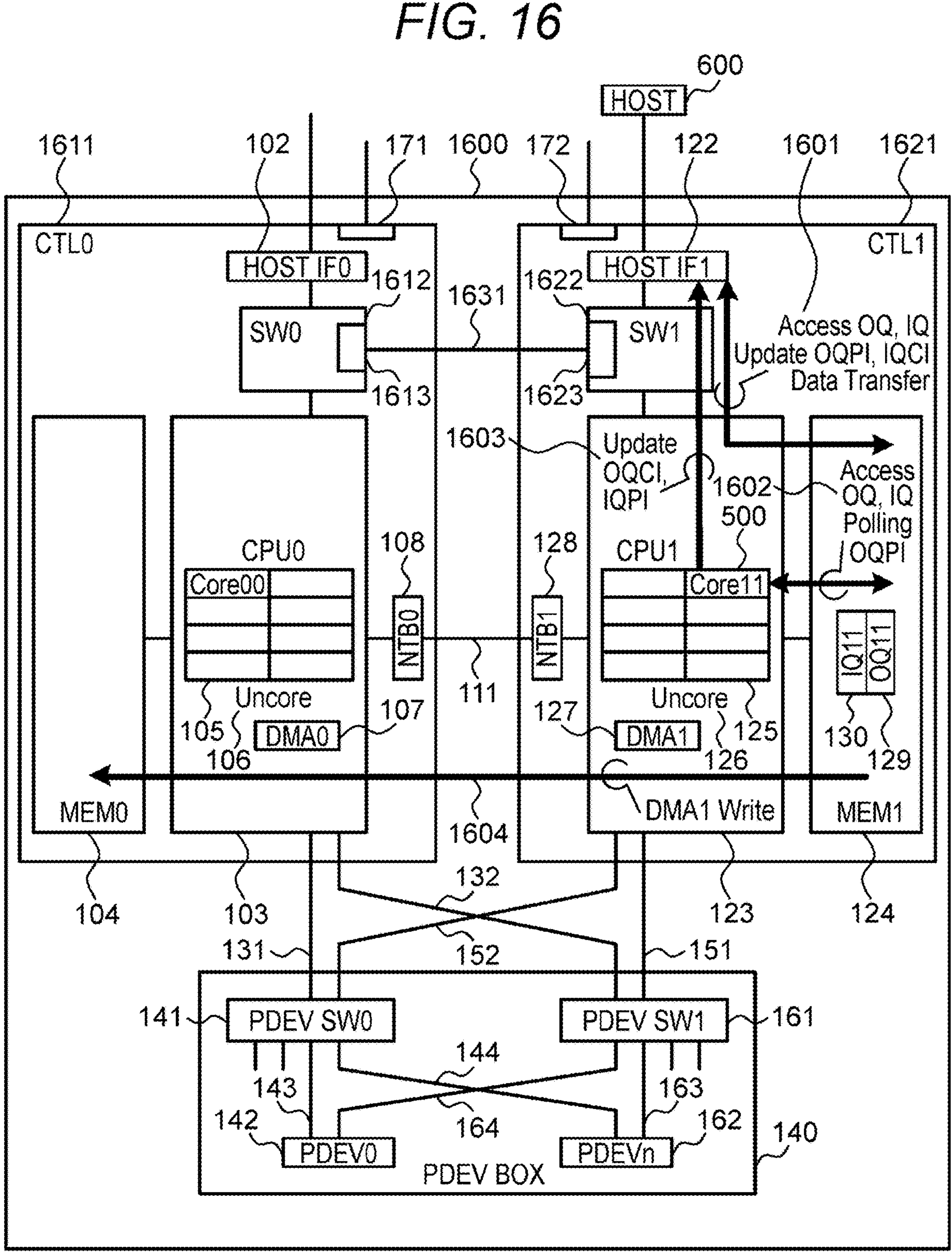
FIG. 16 is a diagram showing data transfer paths related to the host IO process before a host IO is taken over in a storage device according to a third embodiment.

FIG. 16 is a diagram showing data transfer paths related to the host IO process before the host IO is taken over in a storage device 1600. Here, similarly to the storage device 100 according to the first embodiment, it is assumed that the host IO received by the host IF 122 is taken over from the controller 1621 to the controller 1611.

The storage device 1600 has the same configuration as the storage device 100 except for controllers 1611, 1621. The controller 1611 connects the host IF 102 to the CPU 103 via a PCIe switch 1612. Similarly, the controller 1621 connects the host IF 122 to the CPU 123 via a PCIe switch 1622. The PCIe switches 1612, 1622 include NTB ports 1613, 1623, respectively, which are switch ports having an NTB function. Furthermore, the NTB port 1613 of the PCIe switch 1612 and the NTB port 1623 of the PCIe switch 1622 are connected by an inter-controller link 1631. The CPU 103 can access the host IF 122 via the PCIe switch 1612, the inter-controller link 1631, and the PCIe switch 1622.

The CPU 123 can access the host IF 102 via the PCIe switch 1622, the inter-controller link 1631, and the PCIe switch 1612. Except for these points, the controllers 1611, 1621 have the same configuration as the controllers 101, 121. Although the PCIe switch 1612 can connect a plurality of host IFs to the CPU 103, only one host IF 102 is shown in FIG. 16. Similarly, the PCIe switch 1622 can connect a plurality of host IFs to the CPU 123, but only one host IF 122 is shown in FIG. 16.

Here, as an example, data transfer paths when the core 500 of the CPU 123 controls the host IF 122 in the controller 1621 will be described.

The host IF 122 that receives the host IO from the host device 600 accesses the OQ 129 and the IQ 130 in the memory 124 and the OQPI and the IQCI that are queue indexes thereof via the PCIe switch 1622 and a data transfer path 1601 passing through the CPU 123.

The host IF 122 stores the data received from the host device 600 in the memory 124 or transmits data stored in the memory 124 to the host device 600 via the data transfer path 1601.

The core 500 accesses the OQ 129 in the memory 124, the OQPI that is the queue index thereof, and the IQ 130 via the data transfer path 1602.

The core 500 also accesses the OQCI that is the queue index of the OQ 129 in the host IF 122 and the IQPI that is the queue index of the IQ 130 via a data transfer path 1603 passing through the PCIe switch 1622.

The core 500 transfers data received from the host device 600 and stored in the memory 124 from the memory 124 to the memory 104 of the controller 1611 via a data transfer path 1604 passing through the CPU 123, the inter-controller link 111, and the CPU 103 using the DMA 127. As a result, the data received from the host device 600 can be duplicated in the memory 104 of the controller 1611 and the memory 124 of the controller 1621 (the host data duplication process described above).

Figure 17:
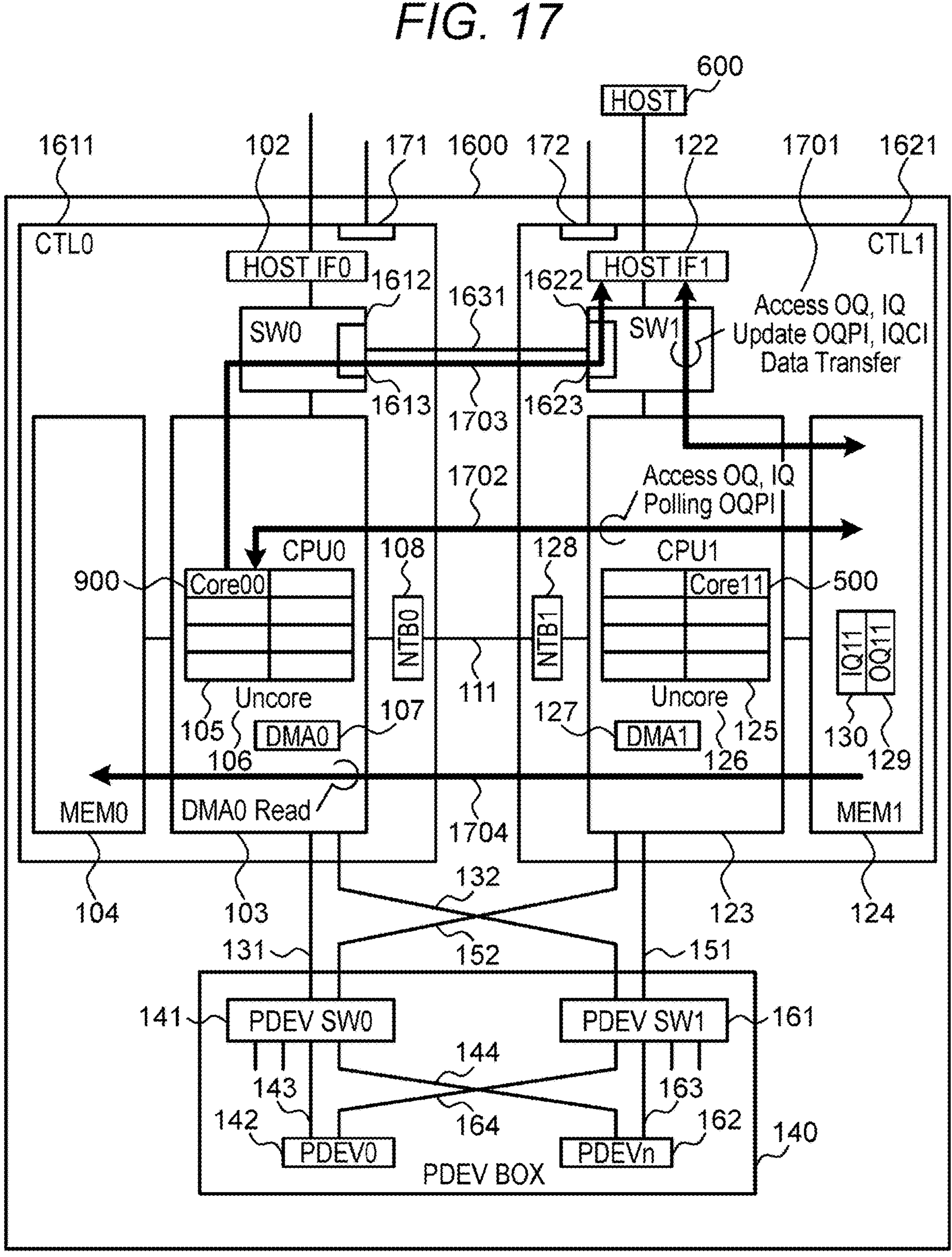
FIG. 17 is a diagram showing data transfer paths related to the host IO process after the host IO is taken over.

FIG. 17 is a diagram showing data transfer paths related to the host IO process after the host IO is taken over in the storage device 1600. As an example, data transfer paths when the core 900 of the CPU 103 belonging to the controller 1611 controls the host IF 122 of the controller 1621 will be described.

The host IF 122 that receives the host IO from the host device 600 accesses the OQ 129 and the IQ 130 in the memory 124 and the OQPI and the IQCI that are the queue indexes thereof via a data transfer path 1701 passing through the CPU 123.

The host IF 122 stores the data received from the host device 600 in the memory 124 or transmits data stored in the memory 124 to the host device 600 via the data transfer path 1701.

The core 900 accesses the OQ 129 in the memory 124, the OQPI that is the queue index thereof, and the IQ 130 via a data transfer path 1702 passing through the inter-controller link 111 and the CPU 123.

The core 900 also accesses the OQCI that is the queue index of the OQ 129 in the host IF 122 and the IQPI that is the queue index of the IQ 130 via a data transfer path 1703 passing through the PCIe switch 1612, the inter-controller link 1631, and the PCIe switch 1622.

The core 900 transfers data received from the host device 600 and stored in the memory 124 from the memory 124 to the memory 104 of the controller 101 via the data transfer path 1704 passing through the CPU 123, the inter-controller link 111, and the CPU 103 using the DMA 107. As a result, the data received from the host device 600 can be duplicated in the memory 104 of the controller 1611 and the memory 124 of the controller 1621 (the host data duplication process described above).

The other operations of the storage device 1600 are similar to those of the storage device 100 according to the first embodiment, and thus, the description thereof will be omitted.

As described above, the storage device 1600 according to the third embodiment is characterized in that the CPU 103 of the controller 1611 accesses the host IF 122 of the controller 1621 via the inter-controller link 1631 to control the host IO process. According to the present embodiment, without using the P2P data transfer path of the CPU as in the storage device 100 according to the first embodiment, it is possible to execute the OS update process and the restart process while maintaining the availability of the dual controller and data redundancy. Continuing the host IO process during the OS restart process can reduce power consumption required to retransmit the input/output request from the host device when the OS restart process is executed.

Note that the present invention is not limited to the above embodiments, and includes various modifications. For example, the above embodiments have been described in detail for better understanding of the present invention and are not necessarily limited to those having all the configurations of the description. A part of the configuration of one embodiment can be replaced with the configuration of another embodiment, or the configuration of another embodiment can be added to the configuration of one embodiment. Also, a part of the configuration of each embodiment can be added, deleted, or replaced with another configuration.

Each of the configurations, functions, processing units, processing means, and the like described above may be implemented in hardware by designing some or all of those in an integrated circuit, for example. Further, each of the configurations, functions, and the like may be implemented in software by a processor interpreting and executing a program for achieving each of the functions. Information such as a program, a table, and a file for implementing each function can be stored in a storage device such as a non-volatile semiconductor memory, a hard disk drive, and a solid-state drive (SSD), or a computer-readable non-transitory data storage medium such as an integrated circuit (IC) card, a secure digital (SD) card, and a digital versatile disc (DVD). The control lines and the information lines indicate those that are considered necessary for description, and not all control lines and information lines are necessarily shown in the product. In practice, almost all configurations may be considered to be interconnected. Each element described in parallel in the present embodiment may have an aspect where at least one of the elements is connected in series with another element.

The present invention can be applied to a storage device related to a technology in which a processor performs a data input/output process in response to an IO request from a host device while controlling a host interface.

What is claimed is:

1. A storage device comprising:

a first controller including: a first processor that controls an input/output process for data according to a request from a host device via a host interface that controls a protocol of communication with the host device; and a first memory having a storage area used by the first processor;

at least one second controller including: a second processor that controls the input/output process for the data according to the request from the host device via the host interface that controls the protocol of communication with the host device; and a second memory having a storage area used by the second processor; and an inter-controller link that connects the first controller and the second controller, wherein the first processor executes an operating system and a storage control program that controls the input/output process for the data according to the request from the host device, and the storage control program includes a placement unit that allocates a virtual address to a first predetermined area in the first memory to which a virtual address is not allocated by the operating system, and places, in the first predetermined area, a first control queue in which the data of the input/output process via the host interface is temporarily stored, a takeover unit that takes over the input/output process from the first processor to the second processor and releases the allocation of the virtual address to the first predetermined area when a restart process of restarting the operating system is executed, a restart unit that executes the restart process of restarting the operating system without initializing the first predetermined area on hardware used by the operating system, and a process resumption unit that reallocates the virtual address to the first predetermined area after the restart process is finished and resumes the input/output process by the first processor.

2. The storage device according to claim 1, wherein the second processor accesses the host interface via a data transfer path passing through the inter-controller link.

3. The storage device according to claim 2, wherein the data transfer path includes a data transfer path passing between two ports included in the first processor.

4. The storage device according to claim 1, wherein the second processor accesses the first control queue via a data transfer path passing through the inter-controller link.

5. The storage device according to claim 1, wherein each of the first processor and the second processor includes a direct memory access (DMA), before the input/output process is taken over from the first processor to the second processor, the data received from the host device is duplicated by data transfer from the first memory to the second memory by the DMA of the first processor, and after the input/output process is taken over from the first processor to the second processor, the data received from the host device is duplicated by data transfer from the first memory to the second memory by the DMA of the second processor.

6. The storage device according to claim 1, wherein when executing the restart process for the operating system, the storage control program stops a process of the first processor writing data received from the host device and stored in the first memory into a storage medium.

7. The storage device according to claim 1, wherein the second memory includes a second control queue for the host interface, and the host interface receives a switching instruction that specifies one of the first control queue or the second control queue as an enqueue destination for a request received from the host device, and switches a control queue as the enqueue destination based on a new request subsequently received from the host device and assigned an identifier for a series of work related to the request.

8. The storage device according to claim 7, wherein when executing the restart process for the operating system, the storage control program executes a restart process without initializing the first predetermined area on hardware used by the operating system after the host interface receives the switching instruction to switch the enqueue destination for the request received from the host device from the first control queue to the second control queue and after the first control queue becomes empty.

9. The storage device according to claim 8, wherein when executing the restart process for the operating system, the storage control program stops the input/output process for the host device executed by the second processor after the host interface receives the switching instruction to switch the enqueue destination for the request received from the host device from the first control queue to the second control queue and after the second control queue becomes empty.

10. The storage device according to claim 1, wherein the restart process is a process of restarting the operating system after an update associated with an update process for the operating system.

11. A method for restarting a storage device that includes a first controller including: a first processor that controls an input/output process for data according to a request from a host device via a host interface that controls a protocol of communication with the host device; and a first memory having a storage area used by the first processor, at least one second controller including: a second processor that controls the input/output process for the data according to the request from the host device via the host interface that controls the protocol of communication with the host device; and a second memory having a storage area used by the second processor, and an inter-controller link that connects the first controller and the second controller, the first processor executing an operating system and a storage control program that controls the input/output process for the data according to the request from the host device, the storage control program executing:

a placement step of allocating a virtual address to a first predetermined area in the first memory to which a virtual address is not allocated by the operating system, and placing, in the first predetermined area, a first control queue in which the data of the input/output process via the host interface is temporarily stored;

a takeover step of taking over the input/output process from the first processor to the second processor and releasing the allocation of the virtual address to the first predetermined area when a restart process of restarting the operating system is executed;

a restart step of executing the restart process of restarting the operating system without initializing the first predetermined area on hardware used by the operating system; and a process resumption step of reallocating the virtual address to the first predetermined area after the restart process is finished and resuming the input/output process by the first processor.

12. The method for restarting the storage device according to claim 11, wherein each of the first processor and the second processor includes a direct memory access (DMA), before the input/output process is taken over from the first processor to the second processor, the data received from the host device is duplicated by data transfer from the first memory to the second memory by the DMA of the first processor, and after the input/output process is taken over from the first processor to the second processor, the data received from the host device is duplicated by data transfer from the first memory to the second memory by the DMA of the second processor.

13. The method for restarting the storage device according to claim 11, wherein, when executing the restart process for the operating system, the storage control program stops a process of the first processor writing data received from the host device and stored in the first memory into a storage medium.

14. The method for restarting the storage device according to claim 11, wherein the second memory includes a second control queue for the host interface, and the host interface receives a switching instruction that specifies one of the first control queue or the second control queue as an enqueue destination for a request received from the host device, and switches a control queue as the enqueue destination based on a new request subsequently received from the host device and assigned an identifier for a series of work related to the request.

15. The method for restarting the storage device according to claim 14, wherein when executing the restart process for the operating system, the storage control program executes a restart process without initializing the first predetermined area on hardware used by the operating system after the host interface receives the switching instruction to switch the enqueue destination for the request received from the host device from the first control queue to the second control queue and after the first control queue becomes empty.

16. The method for restarting the storage device according to claim 15, wherein when executing the restart process for the operating system, the input/output process for the host device executed by the second processor is stopped after the host interface receives the switching instruction to switch the enqueue destination for the request received from the host device from the first control queue to the second control queue and after the second control queue becomes empty.

17. The method for restarting the storage device according to claim 11, wherein the restart process is a process of restarting the operating system after an update associated with an update process for the operating system.

* * * * *